United States Patent
Lin et al.

(10) Patent No.: US 10,742,353 B2
(45) Date of Patent: Aug. 11, 2020

(54) CROSS-CORRELATION REDUCTION FOR CONTROL SIGNALS

(71) Applicant: QUALCOMM Incorporated, San Diego, CA (US)

(72) Inventors: Jamie Menjay Lin, San Diego, CA (US); Siddhartha Mallik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/376,895

(22) Filed: Apr. 5, 2019

(65) Prior Publication Data

US 2019/0312671 A1  Oct. 10, 2019

Related U.S. Application Data

(60) Provisional application No. 62/655,046, filed on Apr. 9, 2018.

(51) Int. Cl.
*H04L 1/18* (2006.01)
*H04L 1/00* (2006.01)
(Continued)

(52) U.S. Cl.
CPC ............ *H04L 1/0041* (2013.01); *H04L 1/001* (2013.01); *H04L 5/0044* (2013.01);
(Continued)

(58) Field of Classification Search
CPC ..... H04L 1/0041; H04L 1/001; H04L 5/0044; H04L 5/0048; H04L 5/026; H04L 27/2605
See application file for complete search history.

(56) References Cited

U.S. PATENT DOCUMENTS 5,204,876 A   4/1993 Bruckert et al.
2008/0043859 A1*  2/2008 Moffatt ................. H04B 1/707
                                                        375/260

(Continued)

FOREIGN PATENT DOCUMENTS

WO   WO-1999023844   5/1999

OTHER PUBLICATIONS

Huawei et al., "UE-ID and Value of Frozen Bits for Polar Code", 3GPP Draft; R1-1718370 UE-ID and Value of Frozen Bits for Polar Code, 3rd Generation Partnership Project (3GPP), Mobile Competence Centre ; 650, Route Des Lucioles ; F-06921 Sophia-Antipolis Cedex; F, vol. RAN WG1, No. Prague, CZ; Oct. 9, 2017-Oct. 13, 2017, Oct. 8, 2017 (Oct. 8, 2017), XP051341552, 8 Pages, Retrieved from the Internet: URL:http://www.3gpp.org/ftp/Meetings_3GPP_SYNC/RAN1/Docs/ [retrieved on Oct. 8, 2017], Sections 2.1-2.3.

(Continued)

*Primary Examiner* — Christine T. Tu
(74) *Attorney, Agent, or Firm* — Holland & Hart LLP

(57) ABSTRACT

Methods, systems, and devices for wireless communications are described. In accordance with the described techniques, communicating devices (e.g., an encoder and decoder) may apply an orthogonal cover code to a polar codeword to reduce cross-correlation between different codewords. For example, such techniques may reduce power consumption at a decoding device by providing for earlier decoding termination (e.g., as a result of the reduced cross-correlation). Techniques for generating the cover codes (e.g., on a per-aggregation level basis) and applying the cover codes (e.g., within a search space) are described. Additionally or alternatively, the described techniques may relate to seeding of reference signals used to support decoding of the codewords. Improved orthogonality between reference signal seeds may further suppress codeword recipient ambiguity.

30 Claims, 17 Drawing Sheets

(51) Int. Cl.
H04L 5/00 (2006.01)
H04L 5/02 (2006.01)
H04L 27/26 (2006.01)

(52) U.S. Cl.
CPC ............ H04L 5/0048 (2013.01); H04L 5/026 (2013.01); H04L 27/2605 (2013.01)

(56) References Cited

U.S. PATENT DOCUMENTS

2011/0286497 A1* 11/2011 Nervig .................. H04L 5/0021
375/147
2012/0327871 A1* 12/2012 Ghosh .................. H04L 5/0023
370/329
2013/0163535 A1 6/2013 Anderson et al.

OTHER PUBLICATIONS

Intel Corporation: "Some Remaining Aspects of NR-PDCCH Structure", 3GPP Draft; R1-1802406 Intel PDCCHSTRUCT, 3rd Generation Partnership Project (3GPP), Mobile Competence Centre ; 650, Route Des Lucioles; F-06921 Sophia-Antipolis Cedex; France, vol. RAN WG1, No. Athens. Greece; Feb. 26, 2018-Mar. 2, 2018, Feb. 17, 2018 (Feb. 17, 2018), XP051397931, 8 Pages, Retrieved from the Internet: URL:http://www.3gpp.org/ftp/tsg%5Fran/WG1%5FRL1/TSGR1%5F92/Docs/ [retrieved on Feb. 17, 2018].
International Search Report and Written Opinion—PCT/US2019/026380—ISA/EPO—dated Jul. 8, 2019.

* cited by examiner

CROSS-CORRELATION REDUCTION FOR CONTROL SIGNALS

CROSS REFERENCES

The present Application for Patent claims benefit of U.S. Provisional Patent Application No. 62/655,046 by LIN et al., entitled "CROSS-CORRELATION REDUCTION FOR CONTROL SIGNALS," filed Apr. 9, 2018, assigned to the assignee hereof, and expressly incorporated by reference herein, in its entirety.

BACKGROUND

The following relates generally to wireless communications, and more specifically to cross-correlation reduction for control signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), and discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

Some wireless systems (e.g., LTE, NR) may support control signaling (e.g., physical downlink control channel (PDCCH) signaling) in which a UE performs a large number (e.g., forty or more) of blind decodes for PDCCH in a given slot. Each blind decode may, for instance, correspond to a particular combination of parameter hypotheses (e.g., a search space, tone offset, codeword size, etc.). In some cases, a blind decode hypothesis may land on a set of resources that actually carry a valid control signal that is intended for another user or another group of users. That is, the blind decode hypothesis may have the correct combination of parameter hypotheses (e.g., search space, tone offset, etc.) except the control signal may use a radio network temporary identifier (RNTI) of a different UE. Such codewords may undergo most of all of a decoding process before being classified as intended for another device, and the decoding process may consume power. Improved techniques for cross-correlation reduction for control signals may be desired.

SUMMARY

The described techniques relate to improved methods, systems, devices, and apparatuses that support cross-correlation reduction for control signals. Generally, the described techniques provide for applying an orthogonal cover code to a polar codeword in order to reduce cross-correlation between different control signals. Though aspects of the present disclosure are described in the context of downlink control signaling, it is to be understood that analogous techniques may be used in the context of uplink control signaling without deviating from the scope of the described techniques. Techniques for generating and applying the cover codes (e.g., at an encoder and/or decoder) are discussed herein. In some examples, the cover codes may be determined per user equipment (UE), may be determined per aggregation level of a control search space, may be determined based on repeated base cover codes, or the like. Aspects of the present disclosure may additionally or alternatively relate to seed derivation for reference signals (e.g., demodulation reference signals (DMRS)). For example, aspects of the present disclosure may support the use of a UE-specific or group-specific identifier for control channel DMRS (e.g., which may add randomness when incorrect hypotheses are used in blind control decodes and may therefore reduce a false positive rate, a processing power required to determine that a hypothesis is incorrect, etc.).

A method of wireless communications at a wireless device is described. The method may include determining symbol information associated with a candidate codeword of a control channel, the candidate codeword encoded according to a forward error correction code (e.g., a polar code), applying an orthogonal cover code to the symbol information to obtain demasked symbol information for the candidate codeword, descrambling the demasked symbol information with a scrambling code (e.g., a user-specific scrambling code, a cell-specific scrambling code, a group-specific scrambling code, etc.) to obtain descrambled symbol information for the candidate codeword, performing a decoding operation on the descrambled symbol information according to the forward error correction code, and communicating with a second wireless device based on a result of the decoding operation.

An apparatus for wireless communications is described. The apparatus may include a processor, memory in electronic communication with the processor, and instructions stored in the memory. The instructions may be executable by the processor to cause the apparatus to determining symbol information associated with a candidate codeword of a control channel, the candidate codeword encoded according to a forward error correction code, applying an orthogonal cover code to the symbol information to obtain demasked symbol information for the candidate codeword, descrambling the demasked symbol information with a scrambling code to obtain descrambled symbol information for the candidate codeword, performing a decoding operation on the descrambled symbol information according to the forward error correction code, and communicating with a second wireless device based on a result of the decoding operation.

Another apparatus for wireless communications is described. The apparatus may include determining symbol information associated with a candidate codeword of a control channel, the candidate codeword encoded according to a forward error correction code, applying an orthogonal cover code to the symbol information to obtain demasked symbol information for the candidate codeword, descrambling the demasked symbol information with a scrambling code to obtain descrambled symbol information for the candidate codeword, performing a decoding operation on the descrambled symbol information according to the forward error correction code, and communicating with a second wireless device based on a result of the decoding operation.

A non-transitory computer-readable medium storing code for wireless communications at a wireless device is described. The code may include instructions executable by a processor to determining symbol information associated with a candidate codeword of a control channel, the candidate codeword encoded according to a forward error correction code, applying an orthogonal cover code to the symbol information to obtain demasked symbol information for the candidate codeword, descrambling the demasked symbol information with a scrambling code to obtain descrambled symbol information for the candidate codeword, performing a decoding operation on the descrambled symbol information according to the forward error correction code, and communicating with a second wireless device based on a result of the decoding operation.

In some examples of the method, apparatuses, and non-transitory computer-readable medium described herein, performing the decoding operation may include operations, features, means, or instructions for performing at least one estimation operation based on the descrambled symbol information.

In some examples of the method, apparatuses, and non-transitory computer-readable medium described herein, performing the at least one estimation operation may include operations, features, means, or instructions for terminating the decoding operation prior to sequential decoding of all sub-channels of the forward error correction code based on the descrambled symbol information.

In some examples of the method, apparatuses, and non-transitory computer-readable medium described herein, the candidate codeword includes a set of candidate codewords of a search space set for the control channel, where each of the set of candidate codewords may be associated with an aggregation level of a set of aggregation levels of the search space set.

In some examples of the method, apparatuses, and non-transitory computer-readable medium described herein, the applying the orthogonal cover code may include operations, features, means, or instructions for applying a set of orthogonal cover codes to the set of candidate codewords, each of the set of orthogonal cover codes determined based on one of a set of base orthogonal cover codes, each of the set of base orthogonal cover codes associated with one of the set of aggregation levels.

In some examples of the method, apparatuses, and non-transitory computer-readable medium described herein, the applying the set of orthogonal cover codes may include operations, features, means, or instructions for aligning the set of base orthogonal cover codes to an initial resource for the search space set within the control channel, repeating the set of base orthogonal cover codes to span resources for the search space set within the control channel and determining the set of orthogonal cover codes from the aligned and repeated set of base orthogonal cover codes.

In some examples of the method, apparatuses, and non-transitory computer-readable medium described herein, the search space set may be a first search space set of a set of search space sets configured for the wireless device.

Some examples of the method, apparatuses, and non-transitory computer-readable medium described herein may further include operations, features, means, or instructions for applying a second set of orthogonal cover codes to a second set of candidate codewords of a second search space set of the set of search space sets.

In some examples of the method, apparatuses, and non-transitory computer-readable medium described herein, applying the orthogonal cover code may include operations, features, means, or instructions for applying a user-specific orthogonal cover code to each of the plurality of candidate codewords.

In some examples of the method, apparatuses, and non-transitory computer-readable medium described herein, the orthogonal cover code includes a user-specific orthogonal cover code.

Some examples of the method, apparatuses, and non-transitory computer-readable medium described herein may further include operations, features, means, or instructions for determining the orthogonal cover code based on a protocol type of the control channel.

In some examples of the method, apparatuses, and non-transitory computer-readable medium described herein, the orthogonal cover code includes an orthogonal variable spreading factor code.

In some examples of the method, apparatuses, and non-transitory computer-readable medium described herein, the scrambling code includes a Gold sequence.

In some examples of the method, apparatuses, and non-transitory computer-readable medium described herein, communicating with the second wireless device based on the result of the decoding operation may include operations, features, means, or instructions for identifying control information based on a result of the decoding operation and communicating with the second wireless device according to the control information.

Some examples of the method, apparatuses, and non-transitory computer-readable medium described herein may further include operations, features, means, or instructions for determining the orthogonal cover code by concatenating a plurality of constituent codes, each of the plurality of constituent codes based on one of a plurality of base orthogonal cover codes. In some examples of the method, apparatuses, and non-transitory computer-readable medium described herein, each of the constituent codes has a length based on an exponential function.

Some examples of the method, apparatuses, and non-transitory computer-readable medium described herein may further include operations, features, means, or instructions for determining the orthogonal cover code based on a scaled and sampled continuous waveform function, the continuous waveform function selected from a set of mutually orthogonal continuous waveform functions.

A method of wireless communications at a wireless device is described. The method may include generating a codeword based on applying a forward error correction encoding operation (e.g., a polar encoding operation) to a bit vector, the bit vector including control information for a second wireless device, scrambling symbols of the codeword with a scrambling code to obtain scrambled symbol information associated with the codeword, applying an orthogonal cover code to the scrambled symbol information to generate masked scrambled symbol information associated with the codeword, and transmitting the masked scrambled symbol information to the second wireless device in a control channel.

An apparatus for wireless communications at a is described. The apparatus may include a processor, memory in electronic communication with the processor, and instructions stored in the memory. The instructions may be executable by the processor to cause the apparatus to generating a codeword based on applying a forward error correction encoding operation to a bit vector, the bit vector including control information for a second wireless device, scrambling symbols of the codeword with a scrambling code to obtain scrambled symbol information associated with the codeword, applying an orthogonal cover code to the scrambled symbol information to generate masked scrambled symbol information associated with the codeword, and transmitting the masked scrambled symbol information to the second wireless device in a control channel.

Another apparatus for wireless communications device is described. The apparatus may include generating a codeword based on applying a forward error correction encoding operation to a bit vector, the bit vector including control information for a second wireless device, scrambling symbols of the codeword with a scrambling code to obtain scrambled symbol information associated with the codeword, applying an orthogonal cover code to the scrambled symbol information to generate masked scrambled symbol information associated with the codeword, and transmitting the masked scrambled symbol information to the second wireless device in a control channel.

A non-transitory computer-readable medium storing code for wireless communications at a wireless device is described. The code may include instructions executable by a processor to generating a codeword based on applying a forward error correction encoding operation to a bit vector, the bit vector including control information for a second wireless device, scrambling symbols of the codeword with a scrambling code to obtain scrambled symbol information associated with the codeword, applying an orthogonal cover code to the scrambled symbol information to generate masked scrambled symbol information associated with the codeword, and transmitting the masked scrambled symbol information to the second wireless device in a control channel.

In some examples of the method, apparatuses, and non-transitory computer-readable medium described herein, transmitting the masked scrambled symbol information may include operations, features, means, or instructions for transmitting the masked scrambled symbol information in a control candidate of a search space set of the control channel, the control candidate associated with an aggregation level of a set of aggregation levels of the search space set.

Some examples of the method, apparatuses, and non-transitory computer-readable medium described herein may further include operations, features, means, or instructions for determining the orthogonal cover code based on a base orthogonal cover code associated with the aggregation level.

In some examples of the method, apparatuses, and non-transitory computer-readable medium described herein, determining the orthogonal cover code may include operations, features, means, or instructions for aligning the base orthogonal cover code to an initial resource for the search space set within the control channel and repeating the base orthogonal cover code to span resources for the search space set within the control channel.

In some examples of the method, apparatuses, and non-transitory computer-readable medium described herein, the search space set may be a first search space set of a set of search space sets configured for the second wireless device for the control channel.

Some examples of the method, apparatuses, and non-transitory computer-readable medium described herein may further include operations, features, means, or instructions for applying a second orthogonal cover code to a second scrambled set of symbols of a second search space set of the set of search space sets.

In some examples of the method, apparatuses, and non-transitory computer-readable medium described herein, applying the orthogonal cover code may include operations, features, means, or instructions for applying an aggregation level-specific orthogonal cover code and a user-specific orthogonal cover code to the scrambled symbol information.

In some examples of the method, apparatuses, and non-transitory computer-readable medium described herein, the orthogonal cover code includes a user-specific orthogonal cover code.

Some examples of the method, apparatuses, and non-transitory computer-readable medium described herein may further include operations, features, means, or instructions for determining the orthogonal cover code based on a protocol type of the control channel.

In some examples of the method, apparatuses, and non-transitory computer-readable medium described herein, the orthogonal cover code includes an orthogonal variable spreading factor code.

In some examples of the method, apparatuses, and non-transitory computer-readable medium described herein, the scrambling code includes a Gold sequence.

Some examples of the method, apparatuses, and non-transitory computer-readable medium described herein may further include operations, features, means, or instructions for determining the orthogonal cover code by concatenating a plurality of constituent codes, each of the plurality of constituent codes based on one of a plurality of base orthogonal cover codes. In some examples of the method, apparatuses, and non-transitory computer-readable medium described herein, each of the constituent codes has a length based on an exponential function.

Some examples of the method, apparatuses, and non-transitory computer-readable medium described herein may further include operations, features, means, or instructions for determining the orthogonal cover code based on a scaled and sampled continuous waveform function, the continuous waveform function selected from a set of mutually orthogonal continuous waveform functions.

A method of wireless communications at a wireless device is described. The method may include identifying a seed for a reference signal associated with a control channel, where the seed is based on an identifier associated with the wireless device, receiving at least a portion of the reference signal associated with a candidate codeword of the control channel, the candidate codeword encoded according to a forward error correction code (e.g., a polar code), demodulating symbol information for the candidate codeword based on a channel estimation for the at least the portion of the reference signal, performing a decoding operation on the symbol information according to the forward error correction code, and communicating with a second wireless device based on a result of the decoding operation.

An apparatus for wireless communications is described. The apparatus may include a processor, memory in electronic communication with the processor, and instructions stored in the memory. The instructions may be executable by the processor to cause the apparatus to identifying a seed for a reference signal associated with a control channel, where the seed is based on an identifier associated with the wireless device, receiving at least a portion of the reference signal associated with a candidate codeword of the control channel, the candidate codeword encoded according to a forward error correction code, demodulating symbol information for the candidate codeword based on a channel estimation for the at least the portion of the reference signal, performing a decoding operation on the symbol information according to the forward error correction code, and communicating with a second wireless device based on a result of the decoding operation.

Another apparatus for wireless communications is described. The apparatus may include identifying a seed for a reference signal associated with a control channel, where the seed is based on an identifier associated with the wireless device, receiving at least a portion of the reference signal associated with a candidate codeword of the control channel, the candidate codeword encoded according to a forward error correction code, demodulating symbol information for the candidate codeword based on a channel estimation for the at least the portion of the reference signal, performing a decoding operation on the symbol information according to the forward error correction code, and communicating with a second wireless device based on a result of the decoding operation.

A non-transitory computer-readable medium storing code for wireless communications at a wireless device is described. The code may include instructions executable by a processor to identifying a seed for a reference signal associated with a control channel, where the seed is based on an identifier associated with the wireless device, receiving at least a portion of the reference signal associated with a candidate codeword of the control channel, the candidate codeword encoded according to a forward error correction code, demodulating symbol information for the candidate codeword based on a channel estimation for the at least the portion of the reference signal, performing a decoding operation on the symbol information according to the forward error correction code, and communicating with a second wireless device based on a result of the decoding operation.

In some examples of the method, apparatuses, and non-transitory computer-readable medium described herein, the seed may be specific to the wireless device. In some examples of the method, apparatuses, and non-transitory computer-readable medium described herein, the seed may be associated with a group of wireless devices including the wireless device. In some examples of the method, apparatuses, and non-transitory computer-readable medium described herein, the identifier may be a radio network temporary identifier (RNTI) of the wireless device.

A method of wireless communications at a wireless device is described. The method may include identifying a seed for a reference signal associated with a control channel, where the seed is based on an identifier associated with a second wireless device, generating the reference signal based on the seed, transmitting at least a portion of the reference signal over resources associated with a codeword of the control channel, the codeword encoded according to a forward error correction code and including symbol information for the second wireless device, and communicating with the second wireless device based on the at least the portion of the reference signal.

An apparatus for wireless communications is described. The apparatus may include a processor, memory in electronic communication with the processor, and instructions stored in the memory. The instructions may be executable by the processor to cause the apparatus to identifying a seed for a reference signal associated with a control channel, where the seed is based on an identifier associated with a second wireless device, generating the reference signal based on the seed, transmitting at least a portion of the reference signal over resources associated with a codeword of the control channel, the codeword encoded according to a forward error correction code and including symbol information for the second wireless device, and communicating with the second wireless device based on the at least the portion of the reference signal.

Another apparatus for wireless communications is described. The apparatus may include identifying a seed for a reference signal associated with a control channel, where the seed is based on an identifier associated with a second wireless device, generating the reference signal based on the seed, transmitting at least a portion of the reference signal over resources associated with a codeword of the control channel, the codeword encoded according to a forward error correction code and including symbol information for the second wireless device, and communicating with the second wireless device based on the at least the portion of the reference signal.

A non-transitory computer-readable medium storing code for wireless communications at a wireless device is described. The code may include instructions executable by a processor to identifying a seed for a reference signal associated with a control channel, where the seed is based on an identifier associated with a second wireless device, generating the reference signal based on the seed, transmitting at least a portion of the reference signal over resources associated with a codeword of the control channel, the codeword encoded according to a forward error correction code and including symbol information for the second wireless device, and communicating with the second wireless device based on the at least the portion of the reference signal.

In some examples of the method, apparatuses, and non-transitory computer-readable medium described herein, the seed may be specific to the second wireless device. In some examples of the method, apparatuses, and non-transitory computer-readable medium described herein, the seed may be associated with a group of wireless devices including the second wireless device. In some examples of the method, apparatuses, and non-transitory computer-readable medium described herein, the identifier may be a RNTI of the second wireless device.

DETAILED DESCRIPTION

Figure 1:
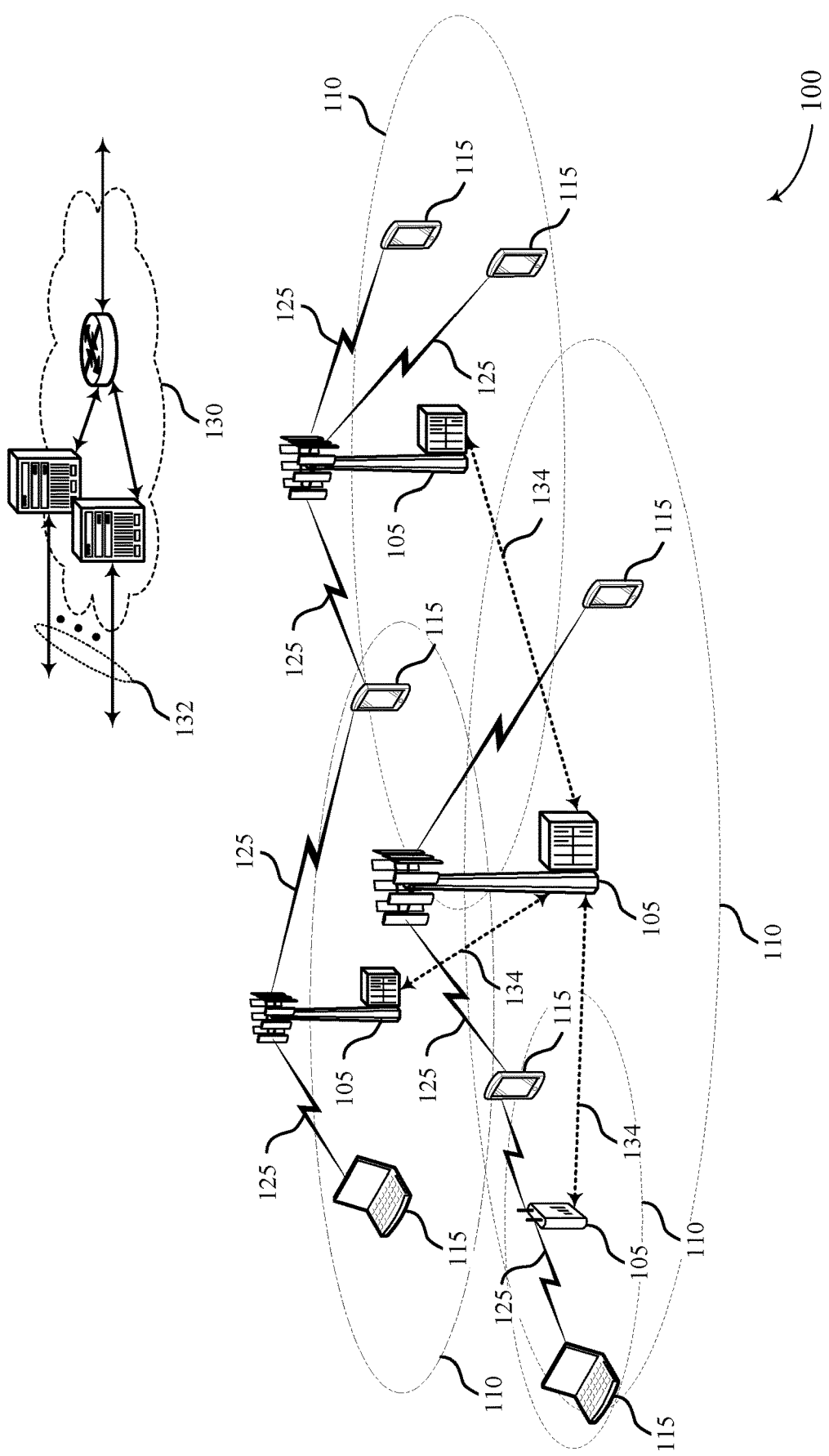
FIG. 1 illustrates an example of a wireless communications system that supports cross-correlation reduction for control signals in accordance with aspects of the present disclosure.

Some wireless systems may support control signaling (e.g., or other types of signaling) that is encoded according to a polar encoding scheme. In aspects of the present disclosure, the control signaling may be referred to as physical downlink control channel (PDCCH) signaling, though it is to be understood that analogous techniques may be applicable to physical uplink control channel (PUCCH) signaling without deviating from the scope of the present disclosure. For PDCCH signaling, a base station may act as an encoder while a user equipment (UE) may act as a decoder. Correspondingly, for PUCCH signaling, the UE may act as the encoder and the base station may act as the decoder. In aspects of the following description, a single device (e.g., a UE or base station) may support functions of both an encoder (e.g., supporting a polar encoding scheme) and decoder (e.g., supporting a polar decoding operation). Alternatively, in some cases, a given device may support polar encoding operations but not polar decoding operations (or vice versa).

PDCCH encoded bits may in some cases be scrambled based on a pseudo-random sequence, and the sequence may be based on a scrambling seed ($C_{init}$) which depends on a cell identity. A UE may receive the control signaling over the air and may perform certain estimations based on the received PDCCH signal (e.g., or portions thereof). For example, the estimations may be based on a demodulation reference signal (DMRS) corresponding to the PDCCH signal. These estimations may, for example, include estimators for a propagation channel, estimators for the quality of the PDCCH signal, and the logarithmic likelihood ratios (LLRs) for the PDCCH codeword. In some cases, the estimators may include the quality measurement taken directly from the components of the received PDCCH codeword. Additionally or alternatively, the estimation operation may involve summation for a portion of the PDCCH signal components (e.g., for coherent combination).

In some cases, a UE may perform multiple (e.g., more than twenty, more than forty, etc.) blind decoding attempts of potential PDCCH polar signals based on a variety of hypothesis parameters (e.g., codeword size, tone offset, etc.). In some cases, the PDCCH polar signals may be scrambled according to pseudo-random sequences (e.g., sequences having non-trivial cross correlation). That is, these pseudo-random sequences (e.g., when presented in the element form of "1" and "−1" rather than "1" and "0") may be non-zero mean sequences, and the cross correlation between at least some of the pseudo-random signals may be non-zero.

Such cross-correlation may negatively impact the blind decoding operation. For example, the cross-correlation may create biases or interference for the estimators described above, which interference may, for example, prolong an incorrect blind decoding hypothesis. Aspects of the present disclosure relate to application of an orthogonal cover code (e.g., a polar codeword orthogonal cover (PCOC)) to reduce cross-correlation and provide benefits to control signaling decoding. Additionally or alternatively, aspects of the present disclosure may relate to use of a seed for reference signal (e.g., DMRS) generation, where the reference signal may be used to demodulate the PDCCH signal. For example, the seed may increase randomness (e.g., or entropy) when an incorrect hypothesis is used in blind PDCCH decodes, which randomness may support earlier termination of the incorrect hypothesis.

Aspects of the disclosure are initially described in the context of a wireless communications system. Aspects of the disclosure are further illustrated by and described with reference to apparatus diagrams, system diagrams, and flowcharts that relate to cross-correlation reduction for control signals.

FIG. 1 illustrates an example of a wireless communications system 100 that supports cross-correlation reduction for control signals in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communications or MTC may refer to data communications technologies that allow devices to communicate with one another or a base station 105 without human intervention. In some examples, M2M communications or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described above, polar encoding and decoding may be used to support control information signaling. In some cases, polar decoding may be based on symbol information related to a polar codeword. For example, the symbol information encoded and transmitted by a first device (e.g., a base station 105 for PDCCH, a UE 115 for PUCCH) may be represented as $$Z_{x,i} = P_{x,i} \otimes S_{x,i} \quad (1)$$

where $Z_{x,i}$ represents a model of the transmitted signal for an intended recipient x, $P_{x,i}$ represents the encoded polar codeword, $S_{x,i}$ represents a user-specific scrambling sequence, $\otimes$ represents a bit element-wise exclusive-or (XOR) operation, and i is an index for components of the sequences.

On the receiver side (e.g., a base station 105 for PUCCH, a UE 115 for PDCCH), the received signal may be equalized, weighted combined, descrambled, and estimated in terms of LLR. These operations may, for example, be represented as $$\hat{P}_{x,i} = \hat{Z}_{x,i} \otimes S_{x,i} \quad (2)$$

where '^' may indicate an approximation (e.g., a channel-modified version) of the components described with reference to Equation 1. As described above (e.g., as part of the estimation operation), a summation over at least a subset of the signal components may be performed for coherent combination as $$e = \Sigma_j \hat{P}_{x,j} = \Sigma_j (\hat{Z}_{x,j} \otimes S_{x,j}) \quad (3)$$

where e represents an estimator and j may belong to the subset of indices over which the coherent combination is performed.

As described above, a receiving device may blindly decode tens or more of potential signals based on a variety of hypothesis parameters. For example, a first UE 115 (e.g., a user x) may attempt to decode a PDCCH polar codeword candidate that is intended for a second UE 115 (e.g., a second user y). The PDCCH polar codeword received at the first UE 115 $\hat{P}_{x,i}$ may be represented (e.g., deconstructed) as $$\hat{P}_{x,i} = \hat{Z}_{y,i} \otimes S_{x,i} \quad (4)$$

where $\hat{Z}_{y,i}$ represents the received symbol information (e.g., which is intended for user y) and $S_{x,i}$ represents the scrambling sequence of user x.

As discussed above, the scrambling sequences may be pseudo-random sequences that have non-trivial cross-correlation (e.g., $\Sigma_i S_{x,i} \otimes S_{y,i}$ may have a non-zero mean). Combining Equations 3 and Equation 4 (e.g., for certain versions of estimators) may yield $$e = \Sigma_j \hat{P}_{x,j} = \Sigma_j (\hat{Z}_{y,j} \otimes S_{x,ju}) \qquad (5)$$

where the indices j may be selected base on a given estimator (e.g., and various weights may in some cases be applied to different indices).

The non-zero cross correlation of such signals may create biases (e.g., interferences) in possible estimators used for decoding the polar codeword. For example, a non-zero value of e in Equation 5 may prolong a decoding attempt for a codeword candidate (e.g., rather than resulting in early termination of the decoding attempt). Various estimator techniques are considered within the scope of the present disclosure. Generally, the estimator techniques may represent intermediate estimates of a decoding operation, where the intermediate estimates may be used to determine whether to continue the decoding operation, in some cases.

In accordance with the described techniques, a PCOC may be used to address cross-correlation concerns (e.g., generally or specifically for polar control signals). For example, the symbol information encoded and transmitted by a first device (e.g., a base station 105 for PDCCH or a UE 115 for PUCCH) may be represented as $$Z'_{x,i} = P_{x,i} \otimes S_{x,i} \otimes C_{x,i} \qquad (6)$$

where $Z'_{x,i}$ represents a model of the transmitted signal for an intended recipient x, $P_{x,i}$ represents the encoded polar codeword, $S_{x,i}$ represents a user-specific scrambling sequence, $\otimes$ represents a bit element-wise XOR operation, $C_{x,i}$ represents an orthogonal code satisfying $C_{x,i} \otimes C_{y,i} = 0$ for $x \neq y$, and i represents a given component of the sequences. The orthogonal code may be a real or complex number (e.g., where, for a complex number, the second XOR operation in Equation 6 may be replaced with a multiplication operation). As an example, orthogonal variable spreading factor (OVSF) codes (e.g., Walsh codes) may be used as the orthogonal code. Examples of such codes and their application to polar codewords are discussed with reference to FIG. 5.

Figure 2:
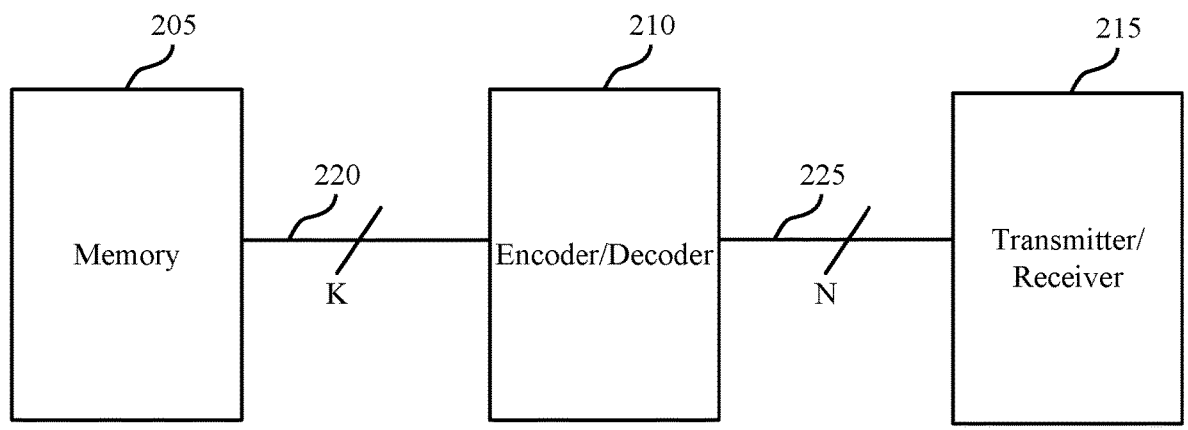
FIG. 2 illustrates an example of a device that supports cross-correlation reduction for control signals in accordance with aspects of the present disclosure.

FIG. 2 illustrates an example of a device 200 that supports cross-correlation reduction for control signals in accordance with aspects of the present disclosure. In some examples, device 200 may implement aspects of wireless communications system 100. The device 200 may be any device within a wireless communications system 100 that performs an encoding or decoding process (e.g., using a forward error correction code, such as a polar code). Device 200 may be an example of a UE 115 or a base station 105 as described with reference to FIG. 1.

As shown, device 200 includes a memory 205, an encoder/decoder 210, and a transmitter/receiver 215. First bus 220 may connect memory 205 to encoder/decoder 210 and second bus 225 may connect encoder/decoder 210 to transmitter/receiver 215. In some cases, device 200 may have data stored in memory 205 to be transmitted to another device, such as a UE 115 or base station 105. To initiate the transmission process, device 200 may retrieve from memory 205 the data for transmission. The data may include a number of payload bits, 'A,' which may be is or 0s (e.g., -is), provided from memory 205 to encoder/decoder 210 via first bus 220. In some cases, these payload bits may be combined with a number of parity or error checking bits, 'E,' to form a total set of information bits, 'A+E.' The number of information bits may be represented as a value 'K,' as shown (e.g., K=A+E). The encoder/decoder 210 may implement a polar code with a block length, 'N,' for encoding the information bits, where N may be different than or the same as K. Such a polar code may be referred to as an (N, K) polar code. In some cases, the bits that not allocated as information bits (e.g., N–K bits) may be assigned as frozen bits.

In some cases, to perform a polar coding operation, the encoder 210 may generate a codeword of length, 'M,' where M is a power of 2 (i.e., $M=2^m$ where m is an integer value). If N is not a power of 2, the encoder 210 may round the value of N up to the nearest valid M value. For example, if N=400, the encoder 210 may determine a codeword length of M=512 (e.g., the nearest valid value for M greater than or equal to N) in order to support polar coding. In these cases, the encoder 210 may encode a codeword of length M, and then may puncture a number of bits M–N to obtain a codeword of the specified block length N for transmission.

The encoder 210 may attempt to assign the information bits to the K most reliable bit channels, and the frozen bits to the remaining bit channels. The encoder/decoder 210 may employ various techniques for determining the K most (or an estimation of the most) reliable bit channels. For example, the encoder/decoder 210 may implement fractal enhanced kernel (FRANK) polar code construction, polarization-weight (PW), generator weight (GW), density evolution (DE), or a combination of these techniques. In some cases, the encoder/decoder 210 may employ look-up-tables that provide bit-channel reliability based on various combinations of N, M, and K. The encoder 210 may determine information bit channels based on the determined bit-channel reliability, and may assign frozen bits to the remaining bit-channels. Frozen bits may be bits of a default value (e.g., 0, 1, etc.) known to both the encoder and decoder (i.e., the encoder encoding information bits at a transmitter and the decoder decoding the codeword received at a receiver). Further, from the receiving device perspective, device 200 may receive a data signal representing the codeword via transmitter/receiver 215, and may decode the signal using decoder 210 to obtain the transmitted data.

In some wireless systems, decoder 210 may be an example of a successive cancellation (SC) or a successive cancellation list (SCL) decoder. A UE 115 or base station 105 may receive a transmission including a codeword (e.g., symbol information representing the unpunctured bits of the codeword) at transmitter/receiver 215, and may send the transmission to the SCL decoder (e.g., decoder 210). The SCL decoder may determine input LLRs for the bit channels of the received codeword. During decoding, the SCL decoder may determine decoded LLRs based on these input LLRs, where the decoded LLRs correspond to each bit channel of the polar code. These decoded LLRs may be referred to as bit metrics. In some cases, if the LLR is zero or a positive value, the SCL decoder may determine the corresponding bit is a 0 bit, and a negative LLR may correspond to a 1 bit. The SCL decoder may use the bit metrics to determine the decoded bit values.

The SCL decoder may employ multiple concurrent SC decoding processes. Each SC decoding process may decode the codeword sequentially (e.g., in order of the bit channel indices). Due to the combination of multiple SC decoding processes, the SCL decoder may calculate multiple decoding path candidates. For example, an SCL decoder of list size 'L' (i.e., the SCL decoder has L SC decoding processes) may calculate L decoding path candidates, and a corresponding reliability metric (e.g., a path metric) for each decoding path candidate. The path metric may represent a reliability of a decoding path candidate or a probability that the corresponding decoding path candidate is the correct set of decoded bits. The path metric may be based on the determined bit metrics and the bit values selected at each bit channel. The SCL decoder may have a number of levels equal to the number of bit channels in the received codeword. At each level, each decoding path candidate may select either a 0 bit or a 1 bit based on a path metric of the 0 bit and the 1 bit. The SCL decoder may select a decoding path candidate based on the path metrics, and may output the bits corresponding to the selected decoding path as the decoded sets of bits. For example, the SCL decoder may select the decoding paths with the highest path metrics for error checking, and may determine a successfully decoded path candidate based on a result of the error checking process.

If an SCL decoder determines that the first number of bits are all frozen bits, the SCL decoder may determine that the correct decoding path for the first number of bits must be the default frozen bit values (e.g., if the default frozen bit value is 0, the correct decoding path for the first number of bits must be all 0's). Once the SCL decoder reaches the first information bit, the SCL decoder may begin performing operations to decode the rest of the bits of the codeword, as the SCL decoder may not be able to determine the correct decoding path from the first information bit onwards (e.g., because the first information bit may be a 0 or a 1). However, the SCL decoder may still determine bit metrics for the bit channels containing frozen bits, and may use these bit metrics when calculating path metrics for the decoding path candidates. For example, the SCL decoder may update the path metric for the decoding candidates after every bit, regardless of bit type (e.g., after each frozen bit, payload bit, parity bit, etc.).

Device 200 may support various aspects of the present disclosure. For example, device 200 may apply an orthogonal cover code to a codeword of length M (e.g., as part of an encoding operation or part of a decoding operation). The orthogonal cover code may, for example, support early termination of a codeword candidate as part of a decoding operation (e.g., by providing for accurate estimation of path metrics for a decoding candidate). In some cases, the early termination may additionally or alternatively be supported by a seeding function for a DMRS associated with the polar codeword.

Figure 3:
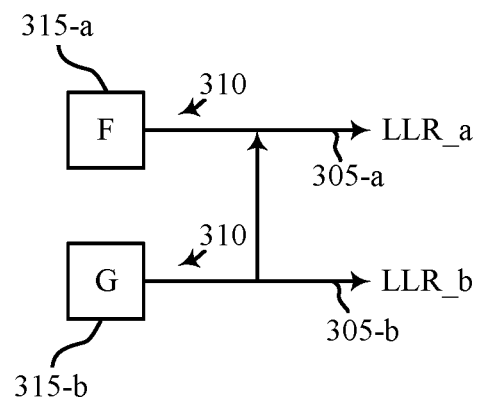
FIG. 3 illustrates an example of a coder/decoder segment that supports cross-correlation reduction for control signals in accordance with aspects of the present disclosure.

FIG. 3 illustrates an example of a coder/decoder (codec) segment 300 that supports cross-correlation reduction for control signals in accordance with aspects of the present disclosure. The codec segment 300 may be implemented in a receiver, such as a receiver included in a UE 115 or base station 105 described with reference to FIG. 1. For example, the codec segment 300 may be performed by the encoder/decoder 210 described with reference to FIG. 2. Codec segment 300 illustrates an example 2-bit decoder.

The codec segment 300 illustrates operations performed to propagate LLRs through a polar decoder (e.g., LLRs taken from the output of a descrambling stage of a decoding operation). Because of the construction of the codec segment 300, the relative capacities of the input bit-channels (with arrows drawn in the encoding direction) may be different than the output bit-channels.

The plurality of input LLRs 305 for codec segment 300 may be received corresponding to a plurality of interconnected bit-channels 310. By way of example, codec segment 300 is shown to perform one F operation and one G operation. Each F operation may receive an operand LLR_a 305-*a* and an operand LLR_b 305-*b* and obtain the output LLR 315-*a* by performing a polar code single parity check (SPC) decoding operation (e.g., F operation):

$$F(\text{LLR}\_a, \text{LLR}\_b) = \text{Sign}(\text{LLR}\_a) \times \text{Sign}(\text{LLR}\_b) \times \min(|\text{LLR}\_a|, |\text{LLR}\_b|)$$

The output LLR 315-*a* may represent a decoded bit value (e.g., 0 or 1). Based on the sign of the LLR 315-*a* and an expected value for the decoded bit, the codec segment 300 may assign one or more decoded bit values for the output bit-channel. For example, if the output LLR 315-*a* is negative, the output bit-channel may be assigned a decoded bit value of 1. If the output LLR 315-*a* is greater than or equal to 0, the output bit-channel may be assigned a decoded bit value of 0. In some cases, if the expected bit value for the output bit-channel is different from the decoded bit value corresponding to the LLR 315-*a* (e.g., if the expected bit value corresponds to a frozen bit), the output bit-channel may be assigned to the expected bit value and the path metric corresponding to the output bit-channel is updated based on the LLR 315-*a*.

The assigned value for the output bit-channel may then be used as a feedback bit for a G operation. In some cases, the assigned value for the output bit-channel may be fed back to be used (e.g., in an XOR operation) to determine an output bit value for an F operation that corresponds to the G operation. Each G operation may receive operand LLR_a 305-*a* and operand LLR_b 305-*b* and obtain the output LLR 315-*b* by performing a polar code repetition decoding operation (e.g., G operation):

$$G(\text{LLR}\_a, \text{LLR}\_b) = \text{LLR}\_b + \text{LLR}\_a \text{ if } b = 0$$
$$= \text{LLR}\_b - \text{LLR}\_a \text{ if } b = 1$$

where b is equal to the determined output bit value for the corresponding F operation.

As described above, estimators that operate on the input operands LLR_a 305-*a* and LLR_b 305-*b*, or results of the corresponding F and G operations, may suffer from bias as a result of cross-correlation between descrambled codewords. Aspects of the present disclosure relate to techniques for mitigating the negative effects of such improper bias (e.g., to enhance early termination of decoding for a given candidate codeword).

Figure 4:
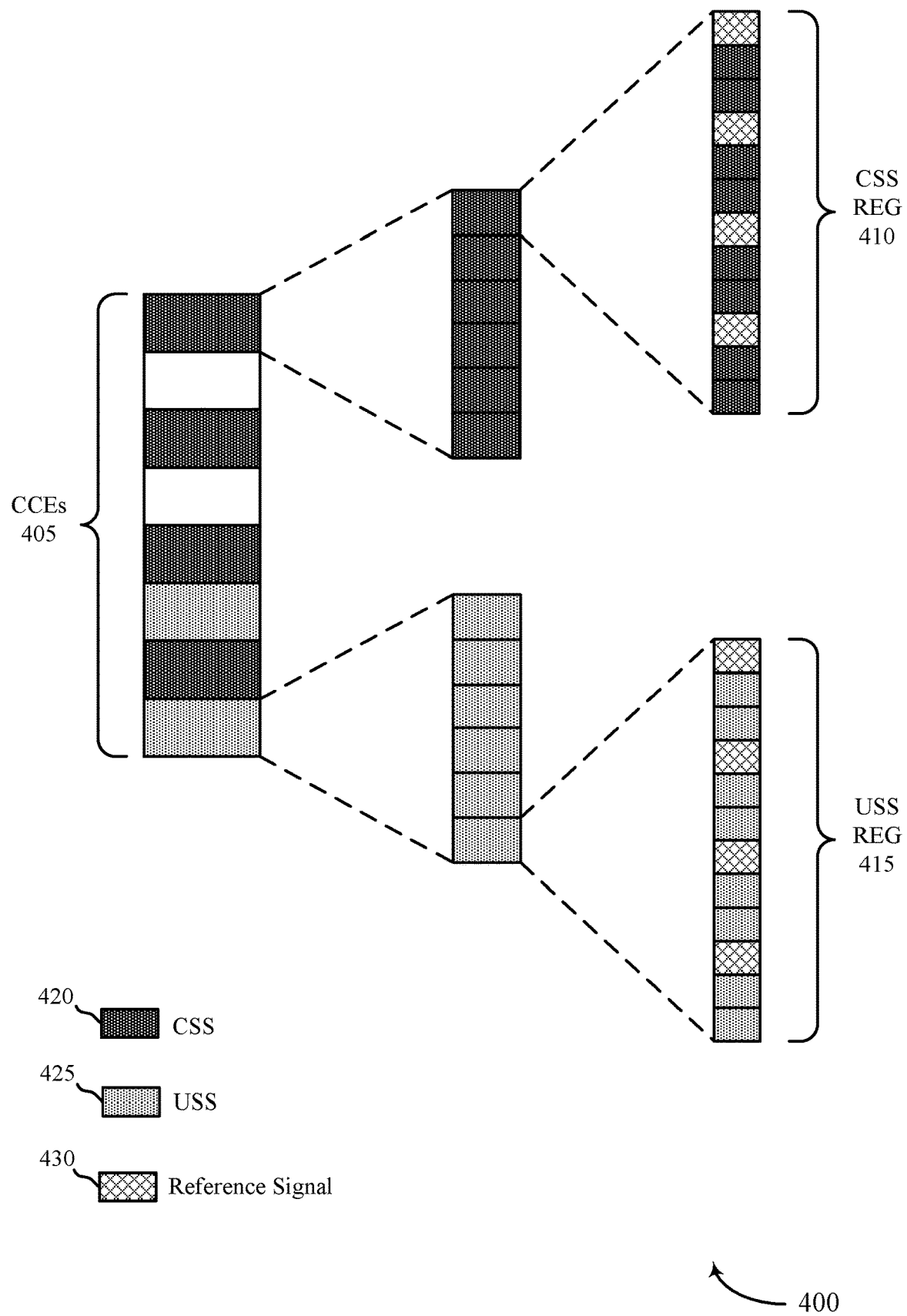
FIG. 4 illustrates an example of a control resource set that support cross-correlation reduction for control signals in accordance with aspects of the present disclosure.

FIG. 4 illustrates an example of a control resource set 400 that supports cross-correlation reduction for control signals in accordance with aspects of the present disclosure. In some examples, control resource set 400 may implement aspects of wireless communications system 100. Control resource set 400 may include a number of control channel elements (CCEs) 405, each of which may include multiple REGs (e.g., sets resource elements). For example, CCEs 405 may refer to resource groupings used for PDCCH search spaces. It is to be understood that CCEs 405 may alternatively refer to resource groupings used for PUCCH transmissions in accordance with aspects of the present disclosure.

As described herein, control resource set 400 may include a common search space (CSS) 420 and a user-specific search space (USS) 425. For example, a base station 105 may transmit common control information in CSS 420 of control resource set 400 and UE-specific control information (e.g., to a UE 115) in USS 425 of control resource set 400. In the example of FIG. 4, the base station 105 may transmit common control information in any of four (4) configured CCEs of CSS 420 and/or UE-specific control information in any of two (2) configured CCEs of USS 425. These control candidates are illustrated for the sake of explanation and are not limiting of scope. In some examples, a given search space (e.g., CSS 420 and/or USS 425) may contain multiple control candidates at one or more aggregation levels.

To support decoding (e.g., in order to ensure that a UE 115 is able to correctly decode the control information in CSS 420 and/or USS 425 transmitted in the same control resource set 400), the base station 105 may transmit reference signals 430 in CSS 420 and USS 425 of the control resource set 400. That is, base station 105-a may scramble the reference signals 430 transmitted in CSS 420 (e.g., CSS resource block 410) and the reference signals 430 transmitted in USS 425 (e.g., USS resource block 415) using the same scrambling sequence. Accordingly, the UE 115 may be able to descramble the reference signals transmitted in CSS 420 and USS 425 using the same sequence, and the UE 115 may be able to perform channel estimation for the channel that includes the control resource set 400 to correctly decode the control information (e.g., the polar codeword) in CSS 420 and USS 425.

As described herein, reference signals 430 may be generated based on a seeding function (e.g., which uses a radio network temporary identifier (RNTI), such as a cell-RNTI (c-RNTI) or some other user or group-specific identifier). For example, the seed for the sequence generator for the reference signals 430 that are associated (e.g., within the same CCEs) may depend on the C-RNTI assigned to the UE for control channel, or a group RNTI). It should be understood that although FIG. 4 shows one UE-specific search space (UESS) for one UE 115, other UESSs for other UEs 115 may overlap with the CSS 420 and/or USS 425. Because the reference signals 430 associated with a given search space (e.g., the reference signals 430 associated with a decoding candidate for a given UE 115) may be generated based on an identifier of an intended recipient, additional randomness (e.g., entropy) may be provided for the decoding operation, which may improve early termination of incorrect candidate codewords. That is, because a UE 115 may process the reference signals 430 using its own specific sequence, reference signals 430 that are associated with a codeword candidate intended for another UE (e.g., the reference signals 430 that are within the same CCEs as the codeword candidate) may improve the performance of the estimators described above (e.g., by reducing cross-correlation between UEs 115).

Figure 5:
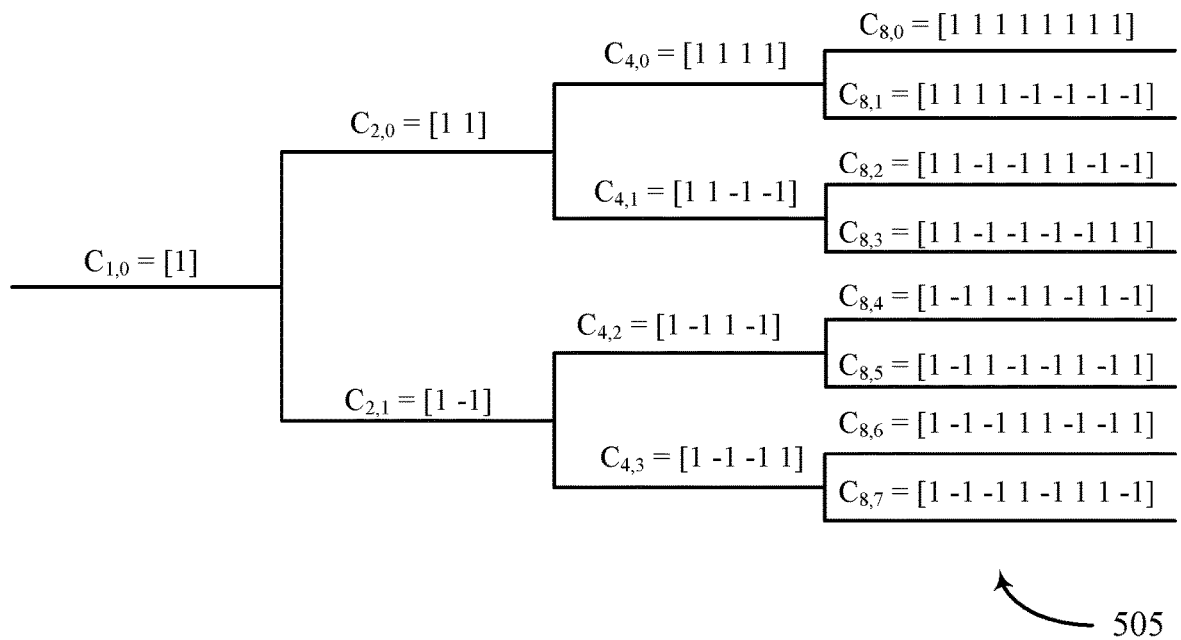
FIG. 5 illustrates an example of a cover code scheme that supports cross-correlation reduction for control signals in accordance with aspects of the present disclosure.
Figure 5:
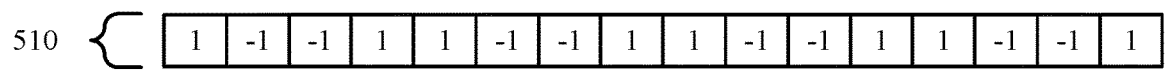
Figure 5:
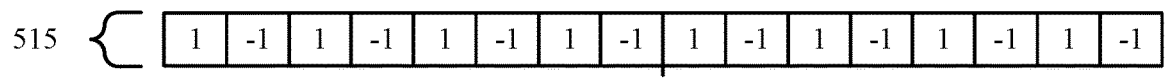
Figure 5:
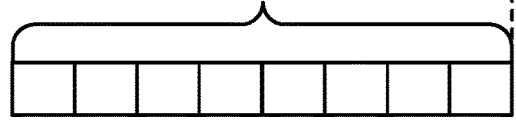
Figure 5:
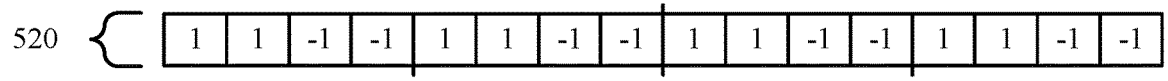
Figure 5:
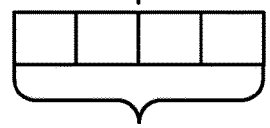

FIG. 5 illustrates an example of a cover code scheme 500 that supports cross-correlation reduction for control signals in accordance with aspects of the present disclosure. In some examples, cover code scheme 500 may be implemented by aspects of wireless communications system 100.

As discussed above, cross-correlation reduction may be important for polar decoding operations. For example, polar codes of common K (e.g., as described with reference to FIG. 2) hypotheses may share a same codeword size (e.g., N as described with reference to FIG. 2), and may thus share a same frozen bit set in some cases. That is, when two polar codewords share N and K lengths, the frozen bit pattern may be the same. Even for two polar codewords with a same N length but different K lengths, a significant portion of the frozen bit patterns may be the same. As discussed above, an estimator may be used to help decoding decisions (e.g., early terminations) based on the codeword LLRs. The accuracy of such estimators may depend on statistical properties of the codewords (e.g., N, K) as well as cross-correlation between scrambling sequences.

As discussed above, scrambling sequences (e.g., Gold sequences) may have a large periodicity but may not provide optimal randomness (e.g., such that certain pairs of Gold sequences or portions thereof may demonstrate elevated cross-correlations). As discussed herein, a PCOC (represented as $C_{x,j}$) of length N may be applied (e.g., directly) on a codeword of length N (e.g., as part of both encoding and decoding operations). The PCOC may help increase orthogonality for portions of Gold sequences that are not sufficiently random and thus exhibit elevated cross-correlation. For portions that are already sufficiently random, the PCOC may flip the bits with a regular pattern (e.g., so as not to destroy the orthogonality for these portions). PCOC application may improve orthogonality between codewords of a same or different aggregation level (e.g., and/or a same or different N length).

Cover code table 505 illustrates example PCOCs for N lengths given by $2^n$, that is, N=1, N=2, N=4, N=8, and so on. As illustrated in FIG. 5, the PCOC generation may be visualized as a tree where a top branch from a node replicates and concatenates the PCOC of the node while the bottom branch inverts the PCOC of the node before concatenation. By selecting PCOC from different branches for different aggregation levels, orthogonality may be provided across aggregation levels. To ensure orthogonality between PCOCs of different aggregation levels, any pair of aggregation levels may be selected so as to not share a same PCOC or portion thereof (e.g., which may be accomplished based on the branched structure described with reference to cover code table 505). The use of a PCOC in an estimator may be represented as $$e' = \Sigma_j \hat{P}'_{x,j} = \Sigma_j (\hat{Z}'_{y,j} \otimes S_{x,j} \otimes C_{x,j}) \qquad (7)$$

for a given PCO $C_{x,j}$.

A mathematically equivalent technique to the branch search described above for selecting PCOC for different aggregation levels may include identifying a number of aggregation levels (e.g., four). Each aggregation level may be associated with an appropriate number of repetitions of a base cover code. For example, if a polar codeword of size N=64 is the smallest supported codeword (e.g., and codewords of size N=128 and N=256 are also supported), three different (e.g., and therefore orthogonal) PCOCs of length 64 (e.g., which may be generated by continuing along cover code table 505) may be selected. A first of the three PCOCs may be used for N=64. A second of the three PCOCs may be replicated once and concatenated to be used for N=128. A third of the three PCOCs may be replicated twice and concatenated to be used for N=256.

Aspects of the present disclosure are described in the context of aggregation-level specific PCOC. Additionally or alternatively, UE-specific PCOCs may be used. For example, for UE-specific PCOC, a network may assign each UE with specific PCOC(s) for blind decodes (e.g., for a range of PDCCHs for a period of time). In some cases, (e.g., for certain protocol types such as ultra-reliable low latency communications (URLLC), massive machine-type-communications (mMTC), IoT, etc.) a UE 115 may be signaled by the network to use specific PCOC(s) for codeword candidates.

Cover code scheme 500 may illustrate aspects of aggregation level-specific PCOC (e.g., in which PCOC is applied according to aggregation level and optionally according to the search space). In cases in which PCOC is applied according to aggregation level and search space, different PCOC may be used for same aggregation-level candidates for different search spaces (e.g., of a USS and CSS as described with reference to FIG. 4).

Cover code scheme 500 may be based on repetition of base cover codes of length N, where N is the length of the lowest aggregation level candidates for the search space. As illustrated, aggregation level 510 (e.g., N=16) may be associated with base cover code [1 –1 –1 1], aggregation level 515 (e.g., N=8) may be associated with base cover code [1 –1 1 –1], and aggregation level 520 (e.g., N=4) may be associated with base cover code [1 1 –1 –1]. These orthogonal base cover codes may be determined or identified based on techniques described herein (e.g., based on cover code table 505). The PCOC applied to a decoding candidate 525 may be aligned from the beginning of the region to which a search space having multiple aggregation levels is mapped (e.g., a first resource element of a region within a control channel that the search space is mapped). For example, the base cover codes of each aggregation level may be aligned and repeated as illustrated in cover code scheme 500, and PCOCs for each aggregation level may be determined from the aligned and repeated base cover codes. Thus, the orthogonal sequences may be applied in a manner that ensures global alignment across all possible aggregation levels in a search space. For example, a PCOC of [1 –1 1 –1 1 –1 1 –1] may be applied to decoding candidate 525-$a$ while a PCOC of [–1 –1 1 1] may be applied to decoding candidate 525-$b$, and the PCOCs may maintain orthogonality regardless of alignment between the decoding candidates within the control channel resources.

Additionally, orthogonality may also be provided for PCOCs of lengths N that are not given by $2^n$. For example, concatenation of component codes may be performed to generate an orthogonal code satisfying $C_{x,i} \otimes C_{y,i}=0$ for $x \neq y$, (e.g., an OVSF code with N length of $2^n$). A notation of $C_x$ is introduced to represent the cover code described above for a user x, having a length $L_x$. In this example, considering a length of $L_x$ not given by $2^n$, $C_x$ may be decomposed (i.e., partitioned) and synthesized (i.e., concatenated) with M constituent code components according to $$C_x = C_{x,0} \copyright C_{x,1} \copyright \ldots \copyright C_{x,M-1} \quad (8)$$

where © represents a concatenation operator between two constituent codes, where the constituent codes $C_{x,i}$, $i \in \{0, 1, \ldots, M-1\}$ may be OVSF codes of length $2^n$, where n is a non-negative integer. In some cases, the constituent codes may be based on or incorporate aspects of the base cover codes as described herein. Accordingly, in terms of length, $$L_x = \Sigma_{i=0}^{M-1} L_i = L_0 + L_1 + \ldots + L_{M-1} \quad (9)$$

where $L_i = 2^n$, and n $\in \{0, 1, 2, \ldots\}$. In some examples, L may be constrained according to a unique ordering (e.g., predetermined ordering) as a function of corresponding indexes for the OVSF codes, as may be configured or negotiated between the transmitter and receiver. In one example, L may be constrained according to $L_0 \leq L_1 \leq \ldots \leq L_{M-1}$, such that the constituent OVSF codes may have monotonically increasing lengths according to their indexes. Alternatively, the lengths of the constituent OVSF codes may be ordered according to a different order. For example, the constituent OVSF codes may have monotonically decreasing lengths according to their indexes or may be interspersed according to their lengths according to a predetermined sequence.

According to the non-2n-length codes defined above, two such codes for different users x and y may be defined:

$$C_x = C_{x,0} \copyright C_{x,1} \copyright \ldots \copyright C_{x,M-1}, \text{ and}$$

$$C_y = C_{y,0} \copyright C_{y,1} \copyright \ldots \copyright C_{y,M-1},$$

Thus, $$C_x \otimes C_y = \Sigma_{m=0}^{M-1}(C_{x,m} \otimes C_{y,m}) = \Sigma_{m=0}^{M-1} 0 = 0 \quad (10)$$

when the corresponding constituent code sequences are pair-wise orthogonal. As such, PCOCs may similarly provide improved orthogonality between codewords of a same or different aggregation level for N lengths that are not given by $2^n$. Accordingly, in some cases, the techniques described herein may reduce power leakage in non-orthogonal scrambling sequences (e.g., Gold sequences), thus providing for relatively reduced interference and improved power savings.

Additionally or alternatively, continuously scalable OVSF (CS-OVSF) codes may similarly provide orthogonality for PCOCs with lengths N that are or are not given by $2^n$. In some cases, one or more continuous waveform functions may be generated from a set of one or more types of continuous antipodal waveforms (e.g., square, triangular, Gaussian, sinusoidal, or other suitable waveforms), for example, with a length of L. A scalar S having a real number value may be applied to the OVSF coded continuous waveform functions, where S=L'/L (where L' is the scaled length), such that the original OVSF code of length L is resampled using its now scaled length.

Resampling (e.g., oversampling) the waveforms may obtain values at each of the component positions of the waveform (e.g., each position of the length of the OVSF code). For example, a sinusoidal function with maxima and minima at 1 and 0 may have component values that are any value in the range {0,1}. A set of CS-OVSF waveforms may be determined using any of a number of techniques. For example, the set of waveforms given by cos (nπx/L) may be orthogonal for any n and 0≤x≤L. Additionally or alternatively, a set of CS-OVSF waveforms may be determined using OFDM modulation. After applying the scalar S to the original CS-OVSF waveforms, the scaled CS-OVSF waveforms may remain mutually orthogonal. That is, the inner product of the component values at corresponding component positions of the waveforms may be equal to zero. By using such CS-OVSF codes, the code length may be scaled from any length L to the length L', the values of each component may be generalized from {0,1} to scaled continuous real numbers, and orthogonality among the scaled CS-OVSF waveforms may be ensured. Accordingly, in some cases, the techniques described herein may reduce power leakage in non-orthogonal scrambling sequences (e.g., Gold sequences), thus providing for reduced interference and improved power savings.

In some cases, more than one PCOC may be applied. For example, multiple levels of PCOCs may be applied to reduce cross correlation across aggregation levels or across RNTIs (e.g., different users, groups of users, or search spaces). In some cases, multiple levels of PCOCs may be given by:

$$Z'_{x,i} = P_{x,i} \otimes S_{x,i} \otimes C_{x_{0},j} \otimes C_{x_{1},j} \otimes \ldots \otimes C_{x_{Q-1},j} \quad (11)$$

where Q represents the number of applicable PCOC codes at a transmitter as part of the encoding process (e.g., such that Q is an integer greater than or equal to 1). Similarly, an estimator used by a receiver for multiple levels of PCOCs may be given by:

$$e' = \Sigma_j \hat{P}_{x,j} \Sigma_j (\hat{Z}'_{y,j} \otimes S_{x,j} \otimes C_{x_{Q-1},j} \otimes \ldots \otimes C_{x_{0},j}) \quad (12)$$

where Q represents the number of applicable PCOC codes at the receiver as part of the decoding process. For example, when Q=2, one of the two PCOC codes may be aggregation-level specific while the other PCOC may be UE-specific. In another example, where Q=3, one of the two PCOC codes may be aggregation-level specific, another PCOC may be UE-specific, and another PCOC may be search space specific. Such multi-level PCOC (e.g., by combining layers of PCOCs) may help reduce cross correlation for blind hypotheses across aggregation levels and across RNTIs.

Figure 6:
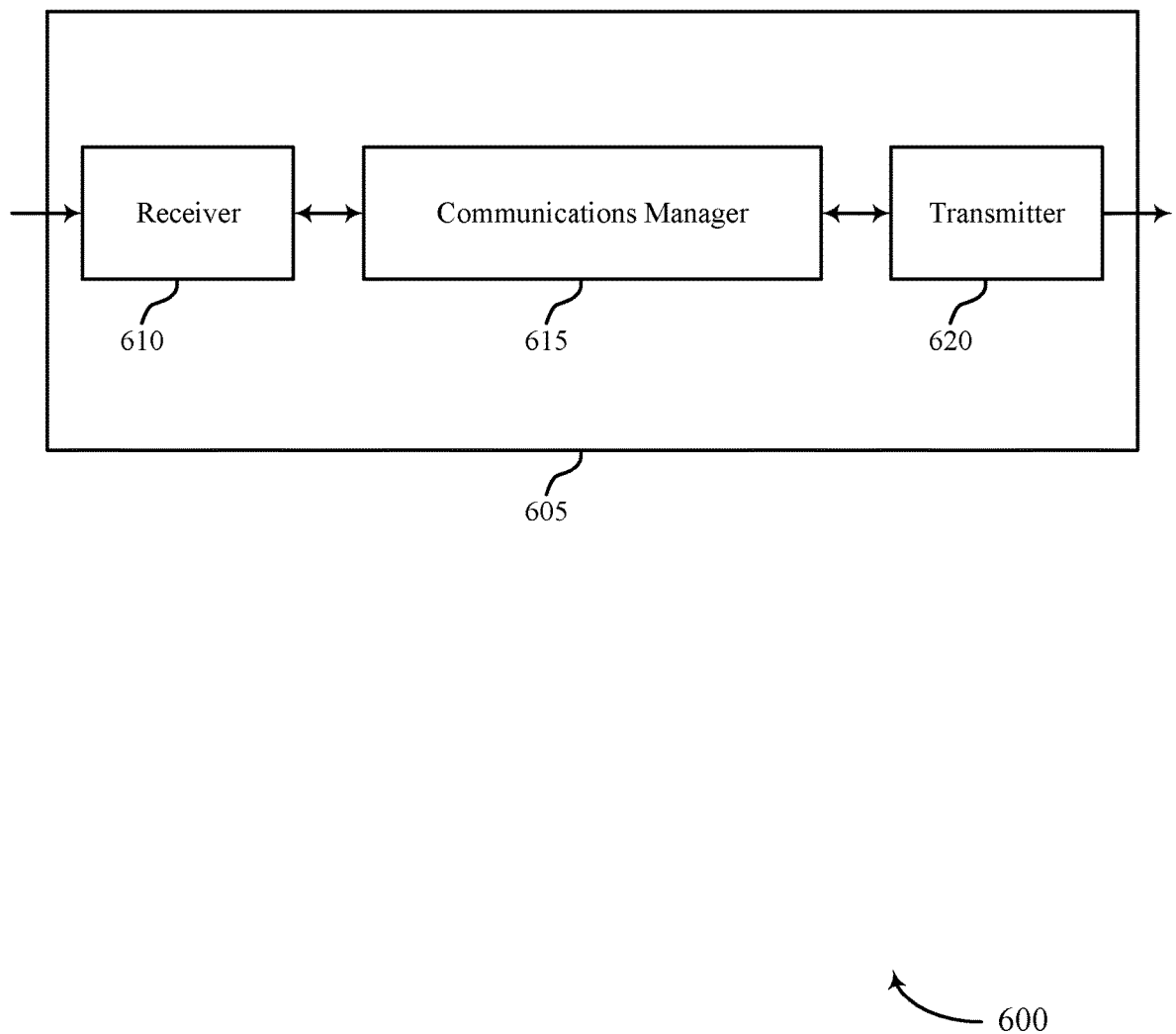
FIGS. 6 and 7 show block diagrams of devices that support cross-correlation reduction for control signals in accordance with aspects of the present disclosure.

FIG. 6 shows a block diagram 600 of a device 605 that supports cross-correlation reduction for control signals in accordance with aspects of the present disclosure. The device 605 may be an example of aspects of a UE 115 or base station 105 as described herein. The device 605 may be an example of aspects of an encoder or decoder as described with reference to FIG. 2. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to cross-correlation reduction for control signals, etc.). Information may be passed on to other components of the device 605. The receiver 610 may be an example of aspects of the transceiver 1220 or 1320 as described with reference to FIGS. 12 and 13. The receiver 610 may utilize a single antenna or a set of antennas.

In some cases, the communications manager 615 may function as part of a device performing decoding (e.g., a UE 115 or base station 105). The communications manager 615 may determine symbol information associated with a candidate codeword of a control channel, the candidate codeword encoded according to a forward error correction code (e.g., a polar code). The communications manager 615 may apply an orthogonal cover code to the symbol information to obtain demasked symbol information for the candidate codeword. The communications manager 615 may descramble the demasked symbol information with a scrambling code (e.g., a user-specific scrambling code, a cell-specific scrambling code, a group-specific scrambling code, etc.) to obtain descrambled symbol information for the candidate codeword. The communications manager 615 may perform a decoding operation on the descrambled symbol information according to the forward error correction code. The communications manager 615 may communicate with a second wireless device based on a result of the decoding operation.

Additionally or alternatively, the communications manager 615 may function as part of a device performing encoding (e.g., a UE 115 or base station 105). The communications manager 615 may, for example, generate a codeword based on applying a forward error correction encoding operation (e.g., a polar encoding operation) to a bit vector, the bit vector including control information for a second wireless device. The communications manager 615 may scramble symbols of the codeword with a scrambling code to obtain scrambled symbol information associated with the codeword. The communications manager 615 may apply an orthogonal cover code to the scrambled symbol information to generate masked scrambled symbol information associated with the codeword. The communications manager 615 may transmit the masked scrambled symbol information to the second wireless device in a control channel. The communications manager 615 may be an example of aspects of the communications manager 1210 or 1310 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 1220 or 1320 as described with reference to FIGS. 12 and 13. The transmitter 620 may utilize a single antenna or a set of antennas.

Figure 7:
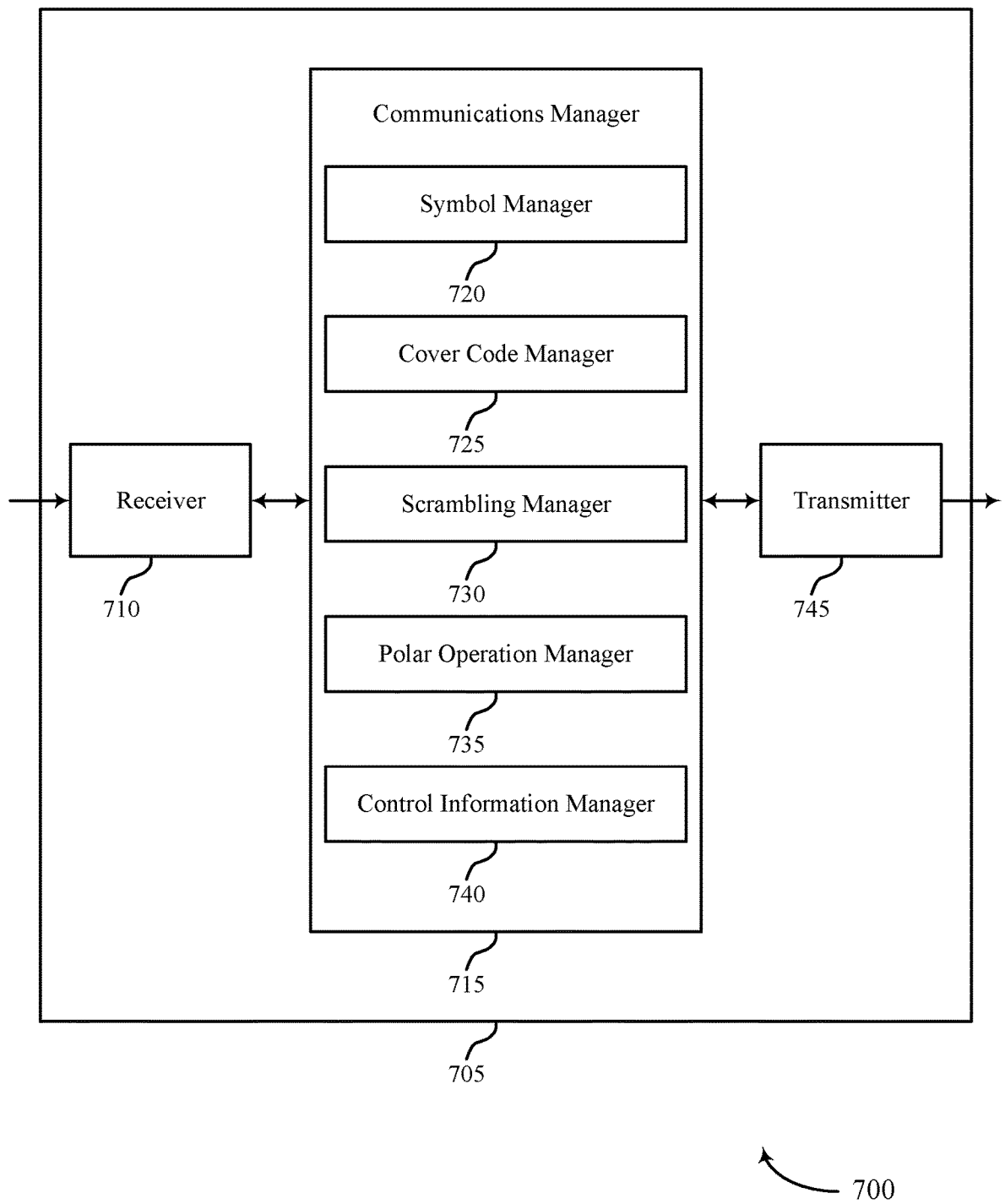

FIG. 7 shows a block diagram 700 of a device 705 that supports cross-correlation reduction for control signals in accordance with aspects of the present disclosure. The device 705 may be an example of aspects of a device 605, a UE 115, a base station 105, and/or a device 200 (e.g., an encoder or decoder) as described herein. The device 705 may include a receiver 710, a communications manager 715, and a transmitter 745. The device 705 may also include a processor. Each of these components may be in communication with one another (e.g., via one or more buses).

Receiver 710 may receive information such as packets, user data, or control information associated with various information channels (e.g., control channels, data channels, and information related to cross-correlation reduction for control signals, etc.). Information may be passed on to other components of the device 705. The receiver 710 may be an example of aspects of the transceiver 1220 or 1320 as described with reference to FIGS. 12 and 13. The receiver 710 may utilize a single antenna or a set of antennas.

The communications manager 715 may be an example of aspects of the communications manager 615 as described herein. The communications manager 715 may include a symbol manager 720, a cover code manager 725, a scrambling manager 730, a polar operation manager 735, and a control information manager 740. The communications manager 715 may be an example of aspects of the communications manager 1210 or 1310 as described herein.

In some cases, the communications manager 715 may function as a part of a device performing a decoding operation. For example, the symbol manager 720 may determine symbol information associated with a candidate codeword of a control channel, the candidate codeword encoded according to a forward error correction code (e.g., a polar code). The cover code manager 725 may apply an orthogonal cover code to the symbol information to obtain demasked symbol information for the candidate codeword. The scrambling manager 730 may descramble the demasked symbol information with a scrambling code (e.g., a user-specific scrambling code, a cell-specific scrambling code, a group-specific scrambling code, etc.) to obtain descrambled symbol information for the candidate codeword. The polar operation manager 735 may perform a decoding operation on the descrambled symbol information according to the forward error correction code. The control information manager 740 may communicate with a second wireless device based on a result of the decoding operation.

Additionally or alternatively, the communications manager 715 may function as part of a device performing an encoding operation. For example, the polar operation manager 735 may generate a codeword based on applying a forward error correction encoding operation (e.g., a polar encoding operation) to a bit vector, the bit vector including control information for a second wireless device. The scrambling manager 730 may scramble symbols of the codeword with a scrambling code to obtain scrambled symbol information associated with the codeword. The cover code manager 725 may apply an orthogonal cover code to the scrambled symbol information to generate masked scrambled symbol information associated with the codeword. The control information manager 740 may transmit the masked scrambled symbol information to the second wireless device in a control channel.

Transmitter 745 may transmit signals generated by other components of the device 705. In some examples, the transmitter 745 may be collocated with a receiver 710 in a transceiver module. For example, the transmitter 745 may be an example of aspects of the transceiver 1220 or 1320 as described with reference to FIGS. 12 and 13. The transmitter 745 may utilize a single antenna or a set of antennas.

Figure 8:
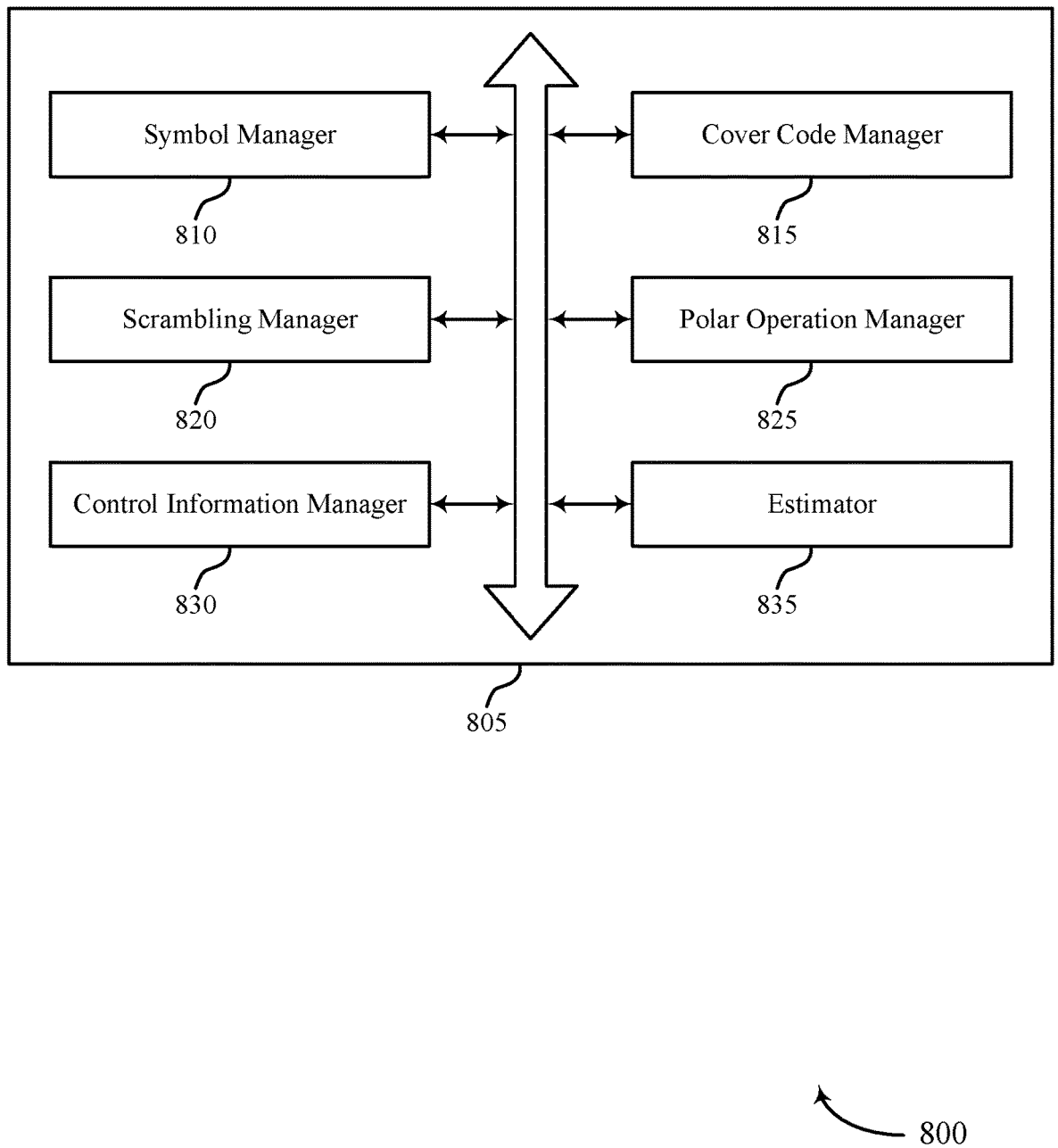
FIG. 8 shows a block diagram of a communications manager that supports cross-correlation reduction for control signals in accordance with aspects of the present disclosure.

FIG. 8 shows a block diagram 800 of a communications manager 805 that supports cross-correlation reduction for control signals in accordance with aspects of the present disclosure. The communications manager 805 may be an example of aspects of a communications manager 615, a communications manager 715, or a communications manager 1210 described herein. The communications manager 805 may include a symbol manager 810, a cover code manager 815, a scrambling manager 820, a polar operation manager 825, a control information manager 830, and an estimator 835. Each of these modules may communicate, directly or indirectly, with one another (e.g., via one or more buses). In some cases, one or more of these modules may represent an optional component of a device (e.g., such that modules that support encoding but do not relate to decoding operations may be omitted from a decoding-specific device).

The symbol manager 810 may determine symbol information associated with a candidate codeword of a control channel, the candidate codeword encoded according to a forward error correction code (e.g., a polar code). In some cases, the candidate codeword includes a set of candidate codewords of a search space set for the control channel, where each of the set of candidate codewords is associated with an aggregation level of a set of aggregation levels of the search space set. In some cases, the search space set is a first search space set of a set of search space sets configured for the wireless device.

In some cases, the cover code manager 815 may support aspects of a decoding operation. The cover code manager 815 may apply an orthogonal cover code to the symbol information to obtain demasked symbol information for the candidate codeword. In some examples, the cover code manager 815 may align the set of base orthogonal cover codes to an initial resource for the search space set within the control channel, repeat the set of base orthogonal cover codes to span resources for the search space set within the control channel, and determine the set of orthogonal cover codes from the aligned and repeated set of base orthogonal cover codes.

In some examples, the cover code manager 815 may determine the orthogonal cover code by concatenating a plurality of constituent codes, where each of the plurality of constituent codes may be based on one of a plurality of base orthogonal cover codes. In some examples, each of the constituent codes may have a length based on an exponential function (e.g., $2^n$). In some examples, the cover code manager 815 may determine the orthogonal cover code based on a scaled or sampled continuous waveform function, the continuous waveform function selected from a set of mutually orthogonal continuous waveform functions.

Additionally or alternatively, the cover code manager 815 may support aspects of an encoding operation. In some examples, the cover code manager 815 may apply an orthogonal cover code to the scrambled symbol information to generate masked scrambled symbol information associated with the codeword. In some examples, the cover code manager 815 may apply a set of orthogonal cover codes to the set of candidate codewords, each of the set of orthogonal cover codes determined based on one of a set of base orthogonal cover codes, each of the set of base orthogonal cover codes associated with one of the set of aggregation levels. In some examples, the cover code manager 815 may apply a second set of orthogonal cover codes to a second set of candidate codewords of a second search space set of the set of search space sets. In some examples, the cover code manager 815 may align the base orthogonal cover code to an initial resource for the search space set within the control channel and repeat the base orthogonal cover code to span resources for the search space set within the control channel. In some examples, the cover code manager 815 may apply a second orthogonal cover code to a second scrambled set of symbols of a second search space set of the set of search space sets.

In some examples, the cover code manager 815 may determine the orthogonal cover code based on a base orthogonal cover code associated with the aggregation level. In some examples, the cover code manager 815 may determine the orthogonal cover code based on a protocol type of the control channel. In some cases, the orthogonal cover code includes a user-specific orthogonal cover code. In some cases, the orthogonal cover code includes an orthogonal variable spreading factor code.

The scrambling manager 820 may descramble the demasked symbol information with a scrambling code (e.g., a user-specific scrambling code, a cell-specific scrambling code, a group-specific scrambling code, etc.) to obtain descrambled symbol information for the candidate codeword (e.g., as part of a decoding operation). Additionally or alternatively, the scrambling manager 820 may scramble symbols of the codeword with a scrambling code to obtain scrambled symbol information associated with the codeword (e.g., as part of an encoding operation).

The polar operation manager 825 may perform a decoding operation on the descrambled symbol information according to the forward error correction code. In some examples, the polar operation manager 825 may terminate the decoding operation prior to sequential decoding of all sub-channels of the forward error correction code based on the descrambled symbol information. Additionally or alternatively, the polar operation manager 825 may generate a codeword based on applying a forward error correction encoding operation (e.g., a polar encoding operation) to a bit vector, the bit vector including control information for a second wireless device.

The control information manager 830 may communicate with a second wireless device based on a result of the decoding operation. In some examples, the control information manager 830 may transmit the masked scrambled symbol information to the second wireless device in a control channel. In some examples, the control information manager 830 may identify control information based on a result of the decoding operation and communicate with the second wireless device according to the control information. In some examples, the control information manager 830 may transmit the masked scrambled symbol information in a control candidate of a search space set of the control channel, the control candidate associated with an aggregation level of a set of aggregation levels of the search space set. In some cases, the search space set is a first search space set of a set of search space sets configured for the second wireless device for the control channel.

The estimator 835 may perform at least one estimation operation based on the descrambled symbol information. For example, the estimator 835 may support aspects of decoding operations as described herein and may be used to determine whether to terminate a given decoding operation.

Figure 9:
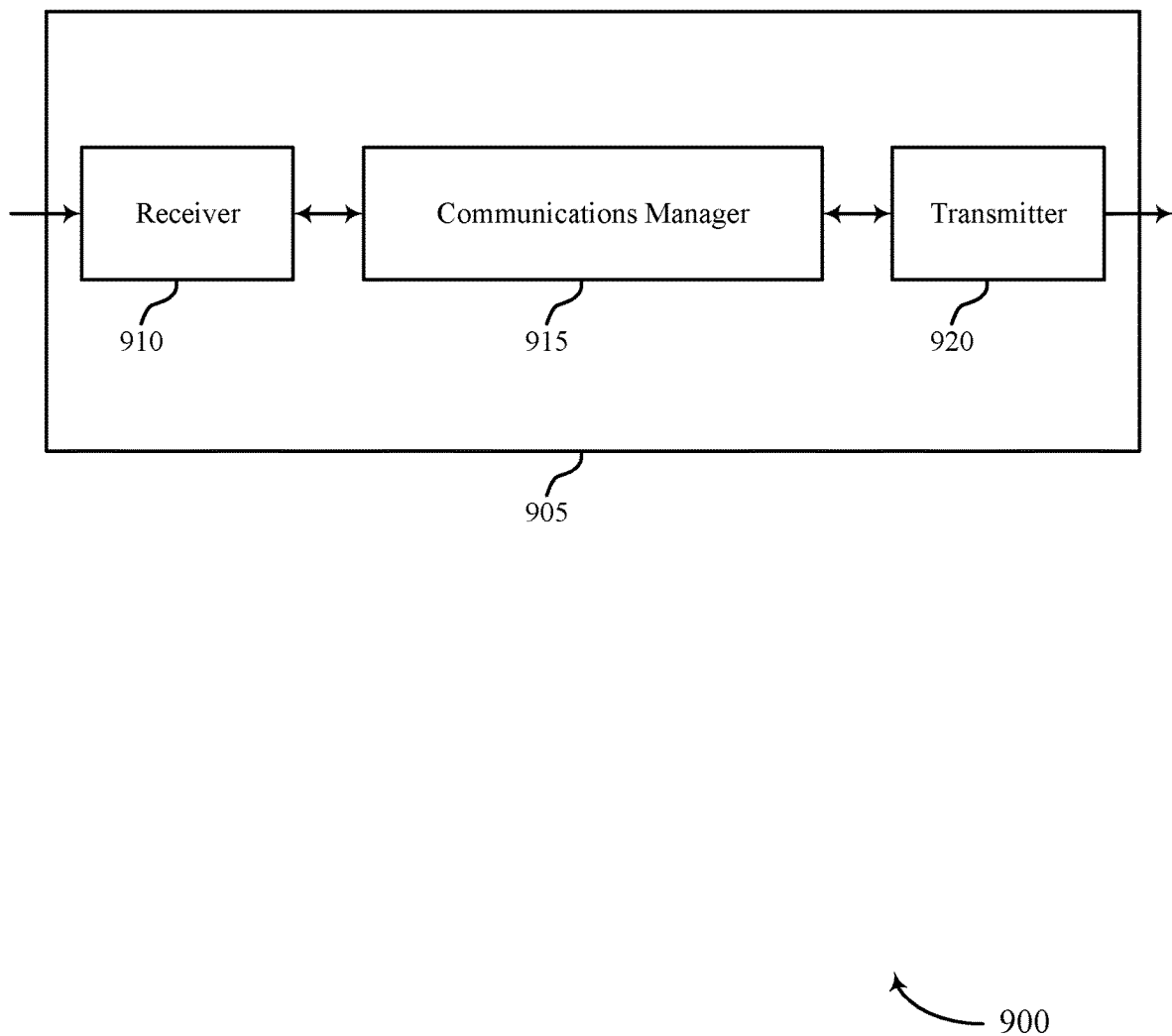
FIGS. 9 and 10 show block diagrams of devices that support cross-correlation reduction for control signals in accordance with aspects of the present disclosure.

FIG. 9 shows a block diagram 900 of a device 905 that supports cross-correlation reduction for control signals in accordance with aspects of the present disclosure. The device 905 may be an example of aspects of a device as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to cross-correlation reduction for control signals, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

In some cases, the communications manager 915 may function as part of a device performing decoding (e.g., a UE 115 or base station 105). The communications manager 915 may identify a seed for a reference signal associated with a control channel, where the seed is based on an identifier associated with the wireless device. The communications manager 915 may receive at least a portion of the reference signal associated with a candidate codeword of the control channel, the candidate codeword encoded according to a forward error correction code (e.g., a polar code). The communications manager 915 may demodulate symbol information for the candidate codeword based on a channel estimation for the at least the portion of the reference signal. The communications manager 915 may perform a decoding operation on the symbol information according to the forward error correction code. The communications manager 915 may communicate with a second wireless device based on a result of the decoding operation.

Additionally or alternatively, the communications manager 915 may function as part of a device performing encoding (e.g., a UE 115 or base station 105). The communications manager 915 may identify a seed for a reference signal associated with a control channel, where the seed is based on an identifier associated with a second wireless device. The communications manager 915 may generate the reference signal based on the seed. The communications manager 915 may transmit at least a portion of the reference signal over resources associated with a codeword of the control channel, the codeword encoded according to a forward error correction code and including symbol information for the second wireless device. The communications manager 915 may communicate with the second wireless device based on the at least the portion of the reference signal. The communications manager 915 may be an example of aspects of the communications manager 1210 or communications manager 1310 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize a single antenna or a set of antennas.

Figure 10:
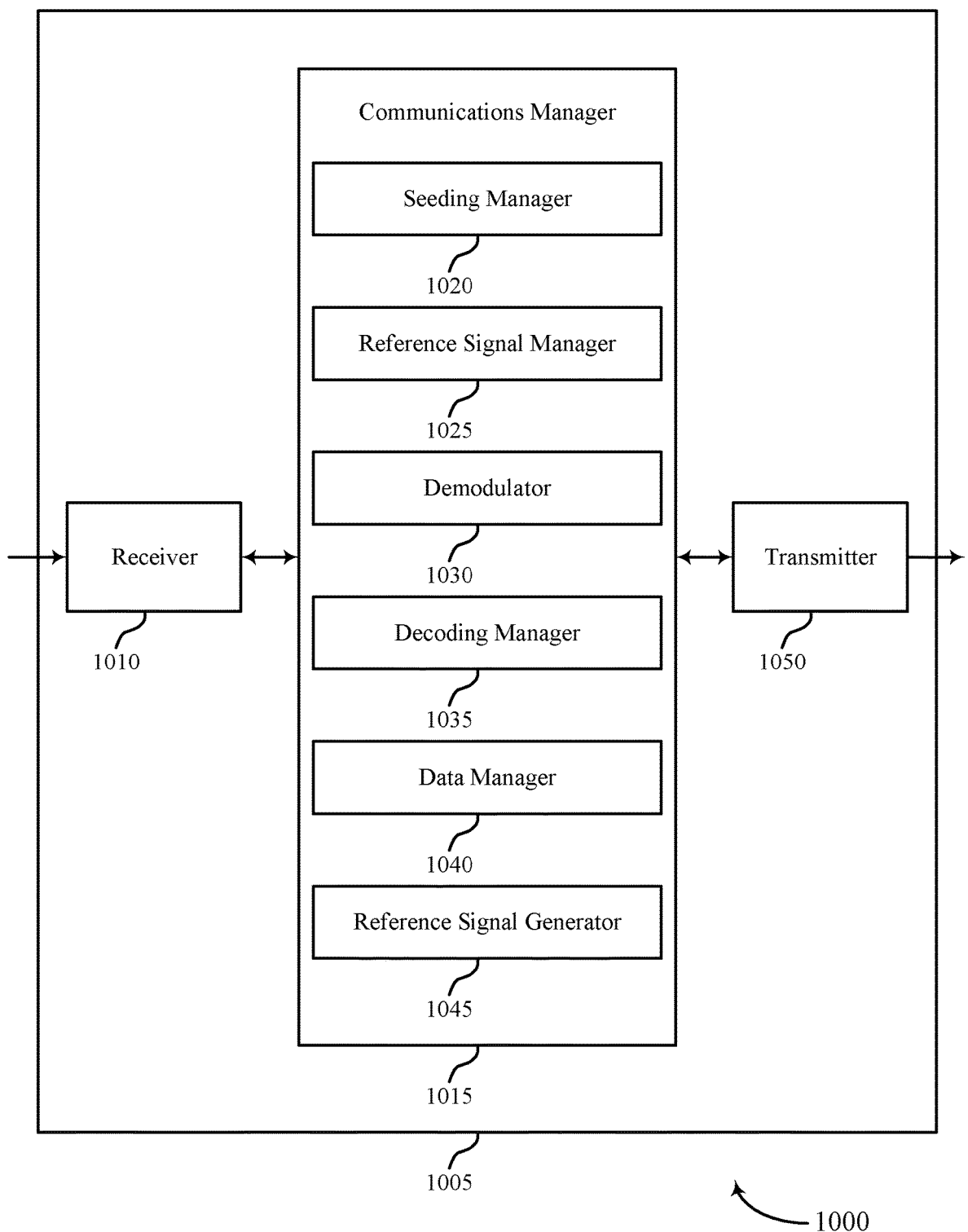

FIG. 10 shows a block diagram 1000 of a device 1005 that supports cross-correlation reduction for control signals in accordance with aspects of the present disclosure. The device 1005 may be an example of aspects of a device 905 or a device 115 as described herein. The device 1005 may include a receiver 1010, a communications manager 1015, and a transmitter 1050. The device 1005 may also include a processor. Each of these components may be in communication with one another (e.g., via one or more buses).

The receiver 1010 may receive information such as packets, user data, or control information associated with various information channels (e.g., control channels, data channels, and information related to cross-correlation reduction for control signals, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a seeding manager 1020, a reference signal manager 1025, a demodulator 1030, a decoding manager 1035, a data manager 1040, and a reference signal generator 1045. The communications manager 1015 may be an example of aspects of the communications manager 1210 or communications manager 1310 described herein.

In some cases, the communications manager 1015 may function as a part of a device performing a decoding operation. The seeding manager 1020 may identify a seed for a reference signal associated with a control channel, where the seed is based on an identifier associated with the wireless device. The reference signal manager 1025 may receive at least a portion of the reference signal associated with a candidate codeword of the control channel, the candidate codeword encoded according to a forward error correction code (e.g., a polar code). The demodulator 1030 may demodulate symbol information for the candidate codeword based on a channel estimation for the at least the portion of the reference signal. The decoding manager 1035 may perform a decoding operation on the symbol information according to the forward error correction code. The data manager 1040 may communicate with a second wireless device based on a result of the decoding operation.

Additionally or alternatively, the communications manager 1015 may function as a part of a device performing an encoding operation. The seeding manager 1020 may identify a seed for a reference signal associated with a control channel, where the seed is based on an identifier associated with a second wireless device. The reference signal generator 1045 may generate the reference signal based on the seed. The reference signal manager 1025 may transmit at least a portion of the reference signal over resources associated with a codeword of the control channel, the codeword encoded according to a forward error correction code and including symbol information for the second wireless device. The data manager 1040 may communicate with the second wireless device based on the at least the portion of the reference signal.

The transmitter 1050 may transmit signals generated by other components of the device 1005. In some examples, the transmitter 1050 may be collocated with a receiver 1010 in a transceiver module. For example, the transmitter 1050 may be an example of aspects of transceiver 1220 or 1320 as described with reference to FIGS. 12 and 13. The transmitter 1050 may utilize a single antenna or a set of antennas.

Figure 11:
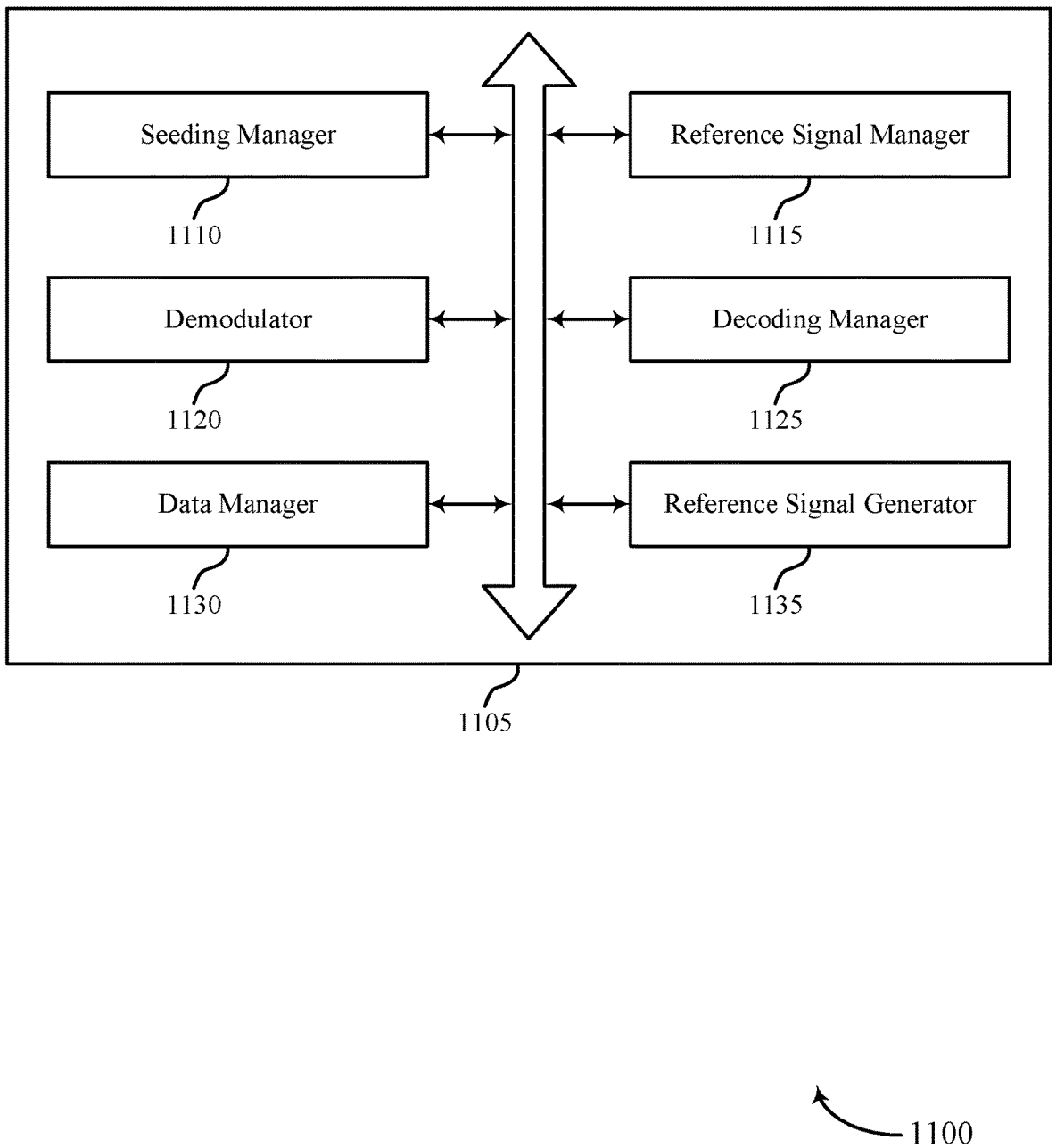
FIG. 11 shows a block diagram of a communications manager that supports cross-correlation reduction for control signals in accordance with aspects of the present disclosure.

FIG. 11 shows a block diagram 1100 of a communications manager 1105 that supports cross-correlation reduction for control signals in accordance with aspects of the present disclosure. The communications manager 1105 may be an example of aspects of a communications manager 915, a communications manager 1015, a communications manager 1210, or a communications manager 1310 described herein. The communications manager 1105 may include a seeding manager 1110, a reference signal manager 1115, a demodulator 1120, a decoding manager 1125, a data manager 1130, and a reference signal generator 1135. Each of these modules may communicate, directly or indirectly, with one another (e.g., via one or more buses). In some cases, one or more of these modules may represent an optional component of a device (e.g., such that modules that support encoding but do not relate to decoding operations may be omitted from a decoding-specific device).

The seeding manager 1110 may identify a seed for a reference signal associated with a control channel, where the seed is based on an identifier associated with the wireless device. In some examples, the seeding manager 1110 may identify a seed for a reference signal associated with a control channel, where the seed is based on an identifier associated with a second wireless device. In some cases, the seed is specific to the wireless device. In some cases, the seed is associated with a group of wireless devices including the wireless device. In some cases, the identifier is a RNTI of the wireless device.

The reference signal manager 1115 may receive at least a portion of the reference signal associated with a candidate codeword of the control channel, the candidate codeword encoded according to a forward error correction code (e.g., a polar code). In some examples, the reference signal manager 1115 may transmit at least a portion of the reference signal over resources associated with a codeword of the control channel, the codeword encoded according to a forward error correction code and including symbol information for the second wireless device.

The demodulator 1120 may demodulate symbol information for the candidate codeword based on a channel estimation for the at least the portion of the reference signal. The decoding manager 1125 may perform a decoding operation on the symbol information according to the forward error correction code. The data manager 1130 may communicate with a second wireless device based on a result of the decoding operation. In some examples, the data manager 1130 may communicate with the second wireless device based on the at least the portion of the reference signal. The reference signal generator 1135 may generate the reference signal based on the seed.

Figure 12:
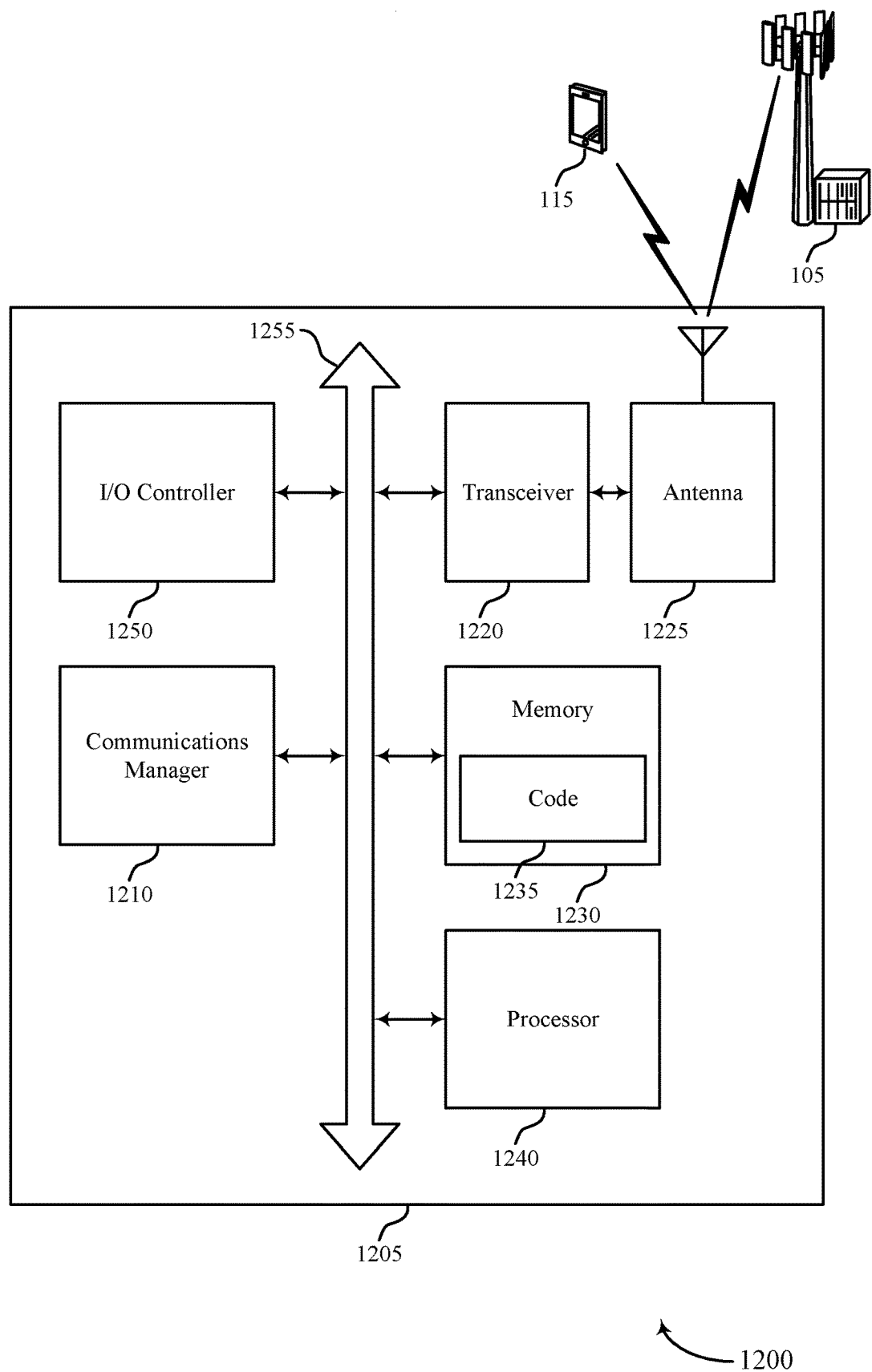
FIGS. 12 and 13 show diagrams of systems including devices that support cross-correlation reduction for control signals in accordance with aspects of the present disclosure.

FIG. 12 shows a diagram of a system 1200 including a device 1205 that supports cross-correlation reduction for control signals in accordance with aspects of the present disclosure. The device 1205 may be an example of or include the components of device 605, device 705, or a UE 115 as described herein. The device 1205 may include components for bi-directional voice and data communications including components for transmitting and receiving communications, including a communications manager 1210, a transceiver 1220, an antenna 1225, memory 1230, a processor 1240, and an I/O controller 1250. These components may be in electronic communication via one or more buses (e.g., bus 1255).

The communications manager 1210 may determine symbol information associated with a candidate codeword of a control channel, the candidate codeword encoded according to a forward error correction code (e.g., a polar code). The communications manager 1210 may apply an orthogonal cover code to the symbol information to obtain demasked symbol information for the candidate codeword. The orthogonal cover code may be determined based on a set of orthogonal codes which may include, for example, OVSF codes, concatenated OVSF codes, or CS-OVSF. The communications manager 1210 may descramble the demasked symbol information with a scrambling code (e.g., a user-specific scrambling code, a cell-specific scrambling code, a group-specific scrambling code, etc.) to obtain descrambled symbol information for the candidate codeword. The communications manager 1210 may perform a decoding operation on the descrambled symbol information according to the forward error correction code. The communications manager 1210 may communicate with a second wireless device based on a result of the decoding operation.

The communications manager 1210 may generate a codeword based on applying a forward error correction encoding operation (e.g., a polar encoding operation) to a bit vector, the bit vector including control information for a second wireless device. The communications manager 1210 may scramble symbols of the codeword with a scrambling code to obtain scrambled symbol information associated with the codeword. The communications manager 1210 may apply an orthogonal cover code to the scrambled symbol information to generate masked scrambled symbol information associated with the codeword. The communications manager 1210 may transmit the masked scrambled symbol information to the second wireless device in a control channel.

The communications manager 1210 may identify a seed for a reference signal associated with a control channel, where the seed is based on an identifier associated with the wireless device. The communications manager 1210 may receive at least a portion of the reference signal associated with a candidate codeword of the control channel, the candidate codeword encoded according to a forward error correction code. The communications manager 1210 may demodulate symbol information for the candidate codeword based on a channel estimation for the at least the portion of the reference signal. The communications manager 1210 may perform a decoding operation on the symbol information according to the forward error correction code. The communications manager 1210 may communicate with a second wireless device based on a result of the decoding operation.

The communications manager 1210 may identify a seed for a reference signal associated with a control channel, where the seed is based on an identifier associated with a second wireless device. The communications manager 1210 may generate the reference signal based on the seed. The communications manager 1210 may transmit at least a portion of the reference signal over resources associated with a codeword of the control channel, the codeword encoded according to a forward error correction code and including symbol information for the second wireless device. The communications manager 1210 may communicate with the second wireless device based on the at least the portion of the reference signal.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include random-access memory (RAM), read-only memory (ROM), or a combination thereof. The memory 1230 may store computer-readable code 1235 including instructions that, when executed by a processor (e.g., the processor 1240) cause the device to perform various functions described herein. In some cases, the memory 1230 may contain, among other things, a Basic Input/Output System (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cross-correlation reduction for control signals).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
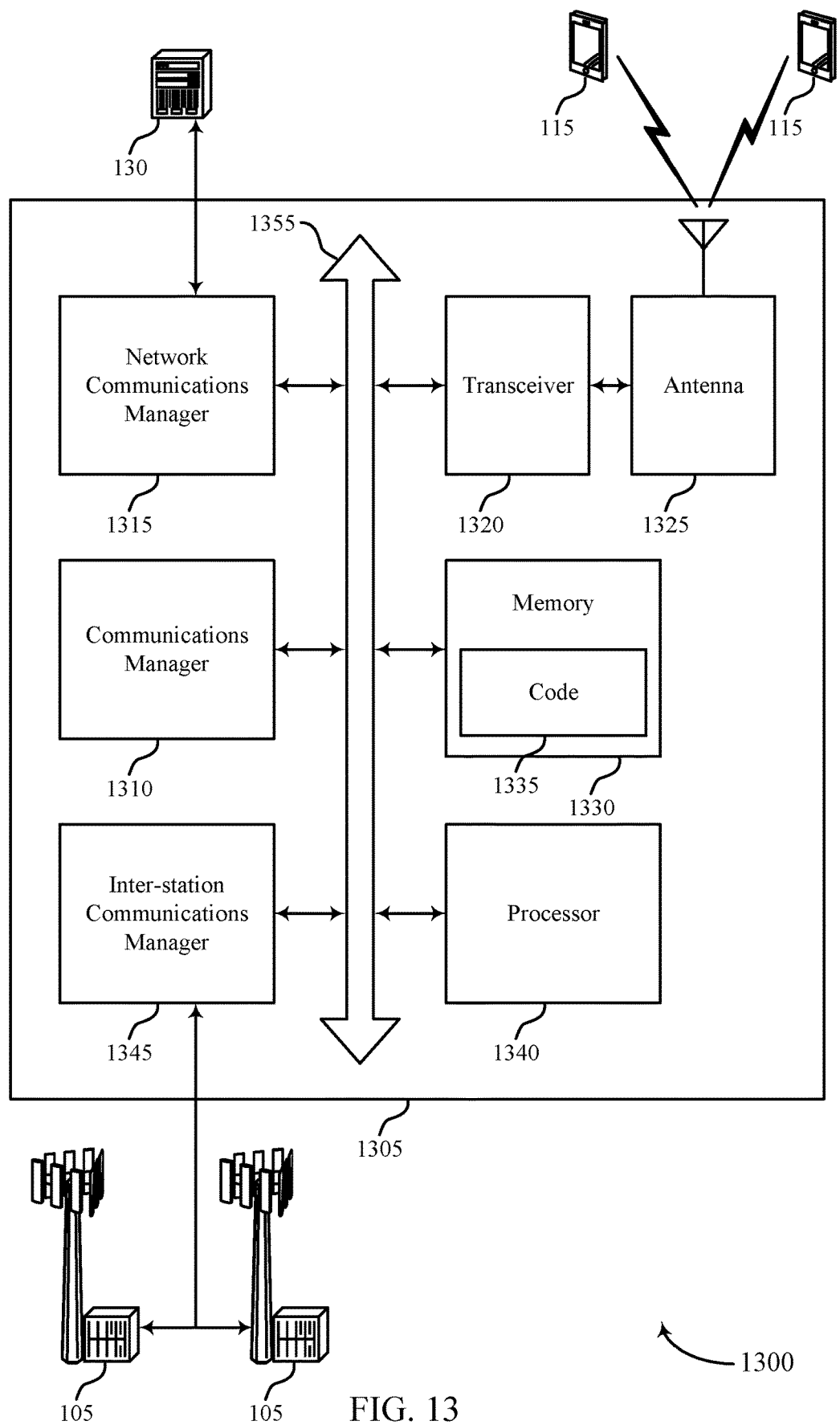

FIG. 13 shows a diagram of a system 1300 including a device 1305 that supports cross-correlation reduction for control signals in accordance with aspects of the present disclosure. The device 1305 may be an example of or include the components of device 605, device 705, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may determine symbol information associated with a candidate codeword of a control channel, the candidate codeword encoded according to a forward error correction code (e.g., a polar code). The communications manager 1310 may apply an orthogonal cover code to the symbol information to obtain demasked symbol information for the candidate codeword. The communications manager 1310 may descramble the demasked symbol information with a scrambling code (e.g., a user-specific scrambling code, a cell-specific scrambling code, a group-specific scrambling code, etc.) to obtain descrambled symbol information for the candidate codeword. The communications manager 1310 may perform a decoding operation on the descrambled symbol information according to the forward error correction code. The communications manager 1310 may communicate with a second wireless device based on a result of the decoding operation.

The communications manager 1310 may generate a codeword based on applying a forward error correction encoding operation (e.g., a polar encoding operation) to a bit vector, the bit vector including control information for a second wireless device. The communications manager 1310 may scramble symbols of the codeword with a scrambling code to obtain scrambled symbol information associated with the codeword. The communications manager 1310 may apply an orthogonal cover code to the scrambled symbol information to generate masked scrambled symbol information associated with the codeword. The communications manager 1310 may transmit the masked scrambled symbol information to the second wireless device in a control channel.

The communications manager 1310 may identify a seed for a reference signal associated with a control channel, where the seed is based on an identifier associated with the wireless device. The communications manager 1310 may receive at least a portion of the reference signal associated with a candidate codeword of the control channel, the candidate codeword encoded according to a forward error correction code. The communications manager 1310 may demodulate symbol information for the candidate codeword based on a channel estimation for the at least the portion of the reference signal. The communications manager 1310 may perform a decoding operation on the symbol information according to the forward error correction code. The communications manager 1310 may communicate with a second wireless device based on a result of the decoding operation.

The communications manager 1310 may identify a seed for a reference signal associated with a control channel, where the seed is based on an identifier associated with a second wireless device. The communications manager 1310 may generate the reference signal based on the seed. The communications manager 1310 may transmit at least a portion of the reference signal over resources associated with a codeword of the control channel, the codeword encoded according to a forward error correction code and including symbol information for the second wireless device. The communications manager 1310 may communicate with the second wireless device based on the at least the portion of the reference signal.

Network communications manager 1315 may manage communications with the core network (e.g., via one or more wired backhaul links). For example, the network communications manager 1315 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting cross-correlation reduction for control signals).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communications network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
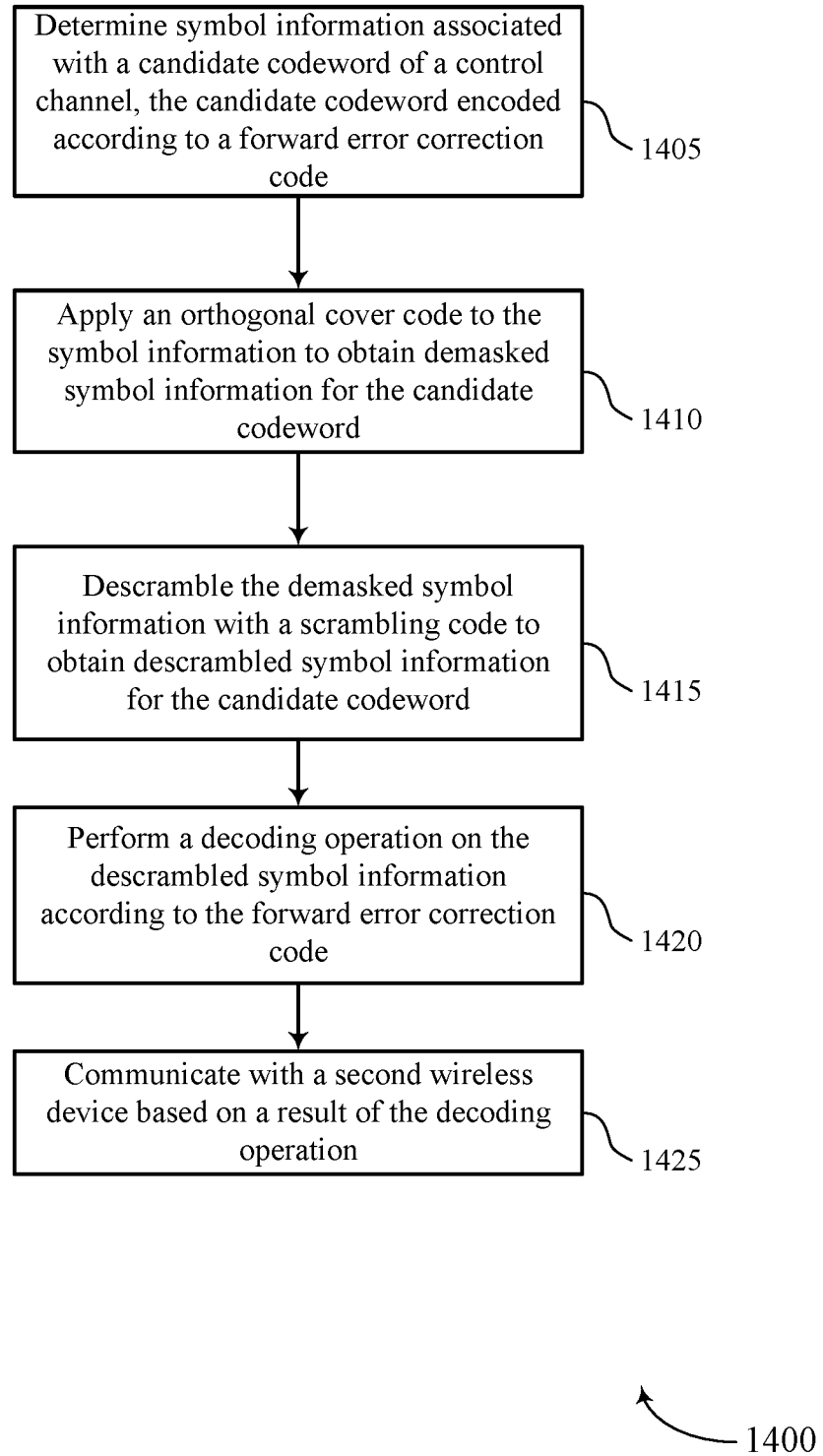
FIGS. 14 through 17 show flowcharts illustrating methods that support cross-correlation reduction for control signals in accordance with aspects of the present disclosure.

FIG. 14 shows a flowchart illustrating a method 1400 that supports cross-correlation reduction for control signals in accordance with aspects of the present disclosure. The operations of method 1400 may be implemented by a UE 115 or base station 105 or its components as described herein. For example, the operations of method 1400 may be performed by a communications manager as described with reference to FIGS. 6 to 13. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may determine symbol information associated with a candidate codeword of a control channel, the candidate codeword encoded according to a forward error correction code (e.g., a polar code). The operations of 1405 may be performed according to the methods described herein. In some examples, aspects of the operations of 1405 may be performed by a symbol manager as described with reference to FIGS. 6 to 13.

At 1410, the UE or base station may apply an orthogonal cover code to the symbol information to obtain demasked symbol information for the candidate codeword. The orthogonal cover code may be determined based on a set of orthogonal codes which may include, for example, OVSF codes, concatenated OVSF codes, or CS-OVSF, for example. The operations of 1410 may be performed according to the methods described herein. In some examples, aspects of the operations of 1410 may be performed by a cover code manager as described with reference to FIGS. 6 to 13.

At 1415, the UE or base station may descramble the demasked symbol information with a scrambling code (e.g., a user-specific scrambling code, a cell-specific scrambling code, a group-specific scrambling code, etc.) to obtain descrambled symbol information for the candidate codeword. The operations of 1415 may be performed according to the methods described herein. In some examples, aspects of the operations of 1415 may be performed by a scrambling manager as described with reference to FIGS. 6 to 13.

At 1420, the UE or base station may perform a decoding operation on the descrambled symbol information according to the forward error correction code. The operations of 1420 may be performed according to the methods described herein. In some examples, aspects of the operations of 1420 may be performed by a polar operation manager as described with reference to FIGS. 6 to 13.

At 1425, the UE or base station may communicate with a second wireless device based on a result of the decoding operation. The operations of 1425 may be performed according to the methods described herein. In some examples, aspects of the operations of 1425 may be performed by a control information manager as described with reference to FIGS. 6 to 13.

Figure 15:
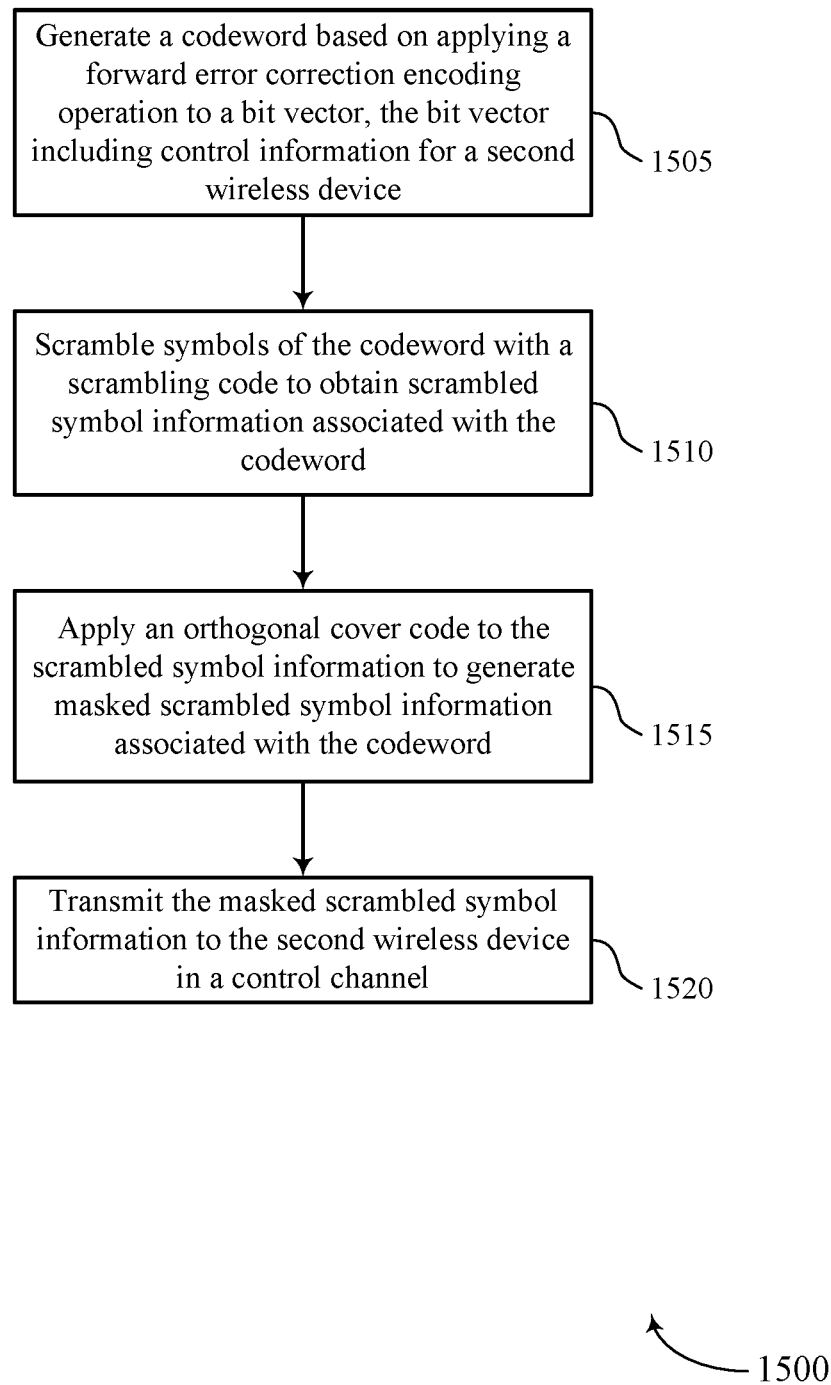

FIG. 15 shows a flowchart illustrating a method 1500 that supports cross-correlation reduction for control signals in accordance with aspects of the present disclosure. The operations of method 1500 may be implemented by a UE 115 or base station 105 or its components as described herein. For example, the operations of method 1500 may be performed by a communications manager as described with reference to FIGS. 6 to 13. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may generate a codeword based on applying a forward error correction encoding operation (e.g., a polar encoding operation) to a bit vector, the bit vector including control information for a second wireless device. The operations of 1505 may be performed according to the methods described herein. In some examples, aspects of the operations of 1505 may be performed by a polar operation manager as described with reference to FIGS. 6 to 13.

At 1510, the UE or base station may scramble symbols of the codeword with a scrambling code (e.g., a user-specific scrambling code, a cell-specific scrambling code, a group-specific scrambling code, etc.) to obtain scrambled symbol information associated with the codeword. The operations of 1510 may be performed according to the methods described herein. In some examples, aspects of the operations of 1510 may be performed by a scrambling manager as described with reference to FIGS. 6 to 13.

At 1515, the UE or base station may apply an orthogonal cover code to the scrambled symbol information to generate masked scrambled symbol information associated with the codeword. The orthogonal cover code may be determined based on a set of orthogonal codes which may include, for example, OVSF codes, concatenated OVSF codes, or CS-OVSF, for example. The operations of 1515 may be performed according to the methods described herein. In some examples, aspects of the operations of 1515 may be performed by a cover code manager as described with reference to FIGS. 6 to 13.

At 1520, the UE or base station may transmit the masked scrambled symbol information to the second wireless device in a control channel. The operations of 1520 may be performed according to the methods described herein. In some examples, aspects of the operations of 1520 may be performed by a control information manager as described with reference to FIGS. 6 to 13.

Figure 16:
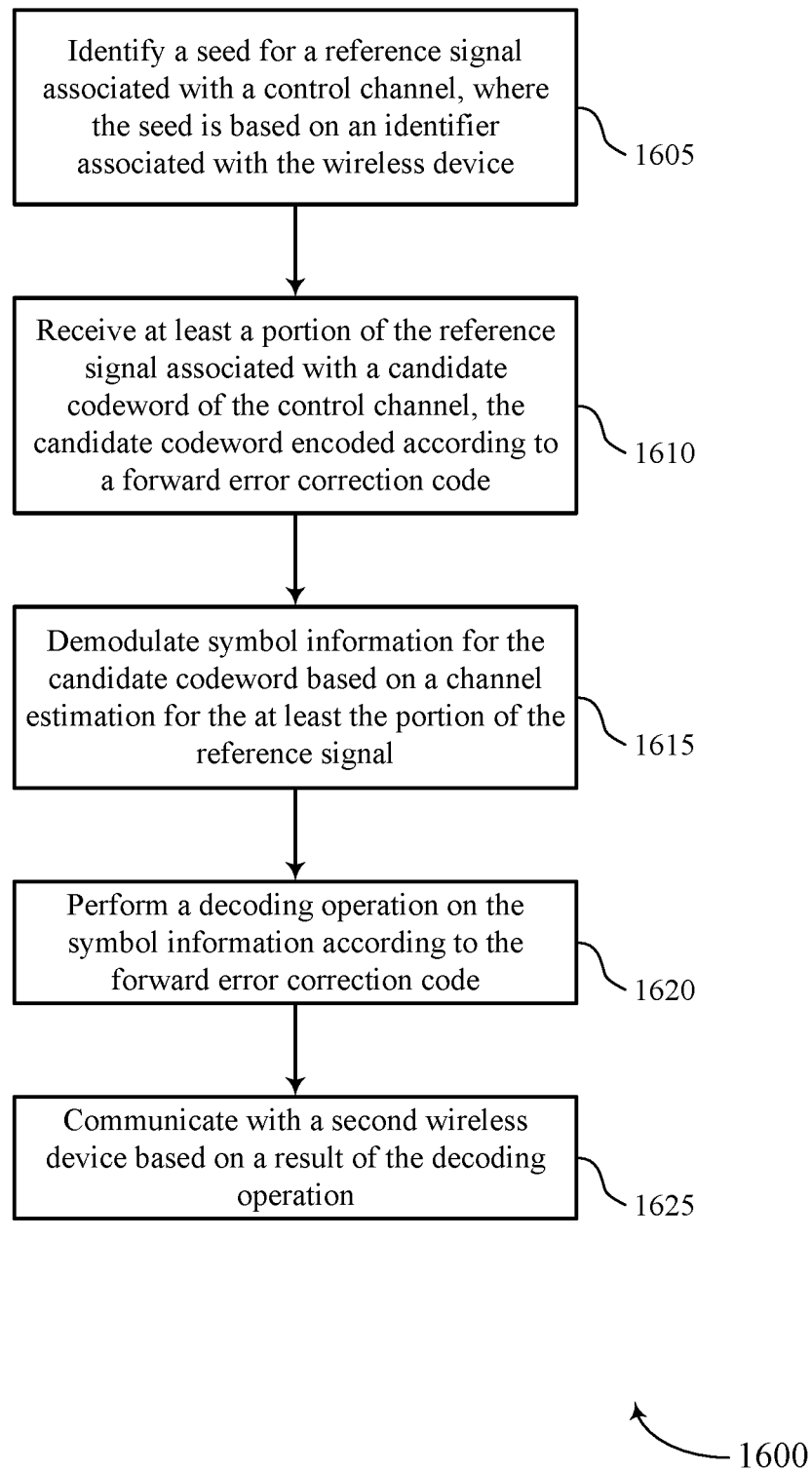

FIG. 16 shows a flowchart illustrating a method 1600 that supports cross-correlation reduction for control signals in accordance with aspects of the present disclosure. The operations of method 1600 may be implemented by a device or its components as described herein. For example, the operations of method 1600 may be performed by a communications manager as described with reference to FIGS. 9 to 13. In some examples, a device may execute a set of instructions to control the functional elements of the device to perform the functions described below. Additionally or alternatively, a device may perform aspects of the functions described below using special-purpose hardware.

At 1605, the device may identify a seed for a reference signal associated with a control channel, where the seed is based on an identifier associated with the wireless device. The operations of 1605 may be performed according to the methods described herein. In some examples, aspects of the operations of 1605 may be performed by a seeding manager as described with reference to FIGS. 9 to 13.

At 1610, the device may receive at least a portion of the reference signal associated with a candidate codeword of the control channel, the candidate codeword encoded according to a forward error correction code (e.g., a polar code). The operations of 1610 may be performed according to the methods described herein. In some examples, aspects of the operations of 1610 may be performed by a reference signal manager as described with reference to FIGS. 9 to 13.

At 1615, the device may demodulate symbol information for the candidate codeword based on a channel estimation for the at least the portion of the reference signal. The operations of 1615 may be performed according to the methods described herein. In some examples, aspects of the operations of 1615 may be performed by a demodulator as described with reference to FIGS. 9 to 13.

At 1620, the device may perform a decoding operation on the symbol information according to the forward error correction code. The operations of 1620 may be performed according to the methods described herein. In some examples, aspects of the operations of 1620 may be performed by a decoding manager as described with reference to FIGS. 9 to 13.

At 1625, the device may communicate with a second wireless device based on a result of the decoding operation. The operations of 1625 may be performed according to the methods described herein. In some examples, aspects of the operations of 1625 may be performed by a data manager as described with reference to FIGS. 9 to 13.

Figure 17:
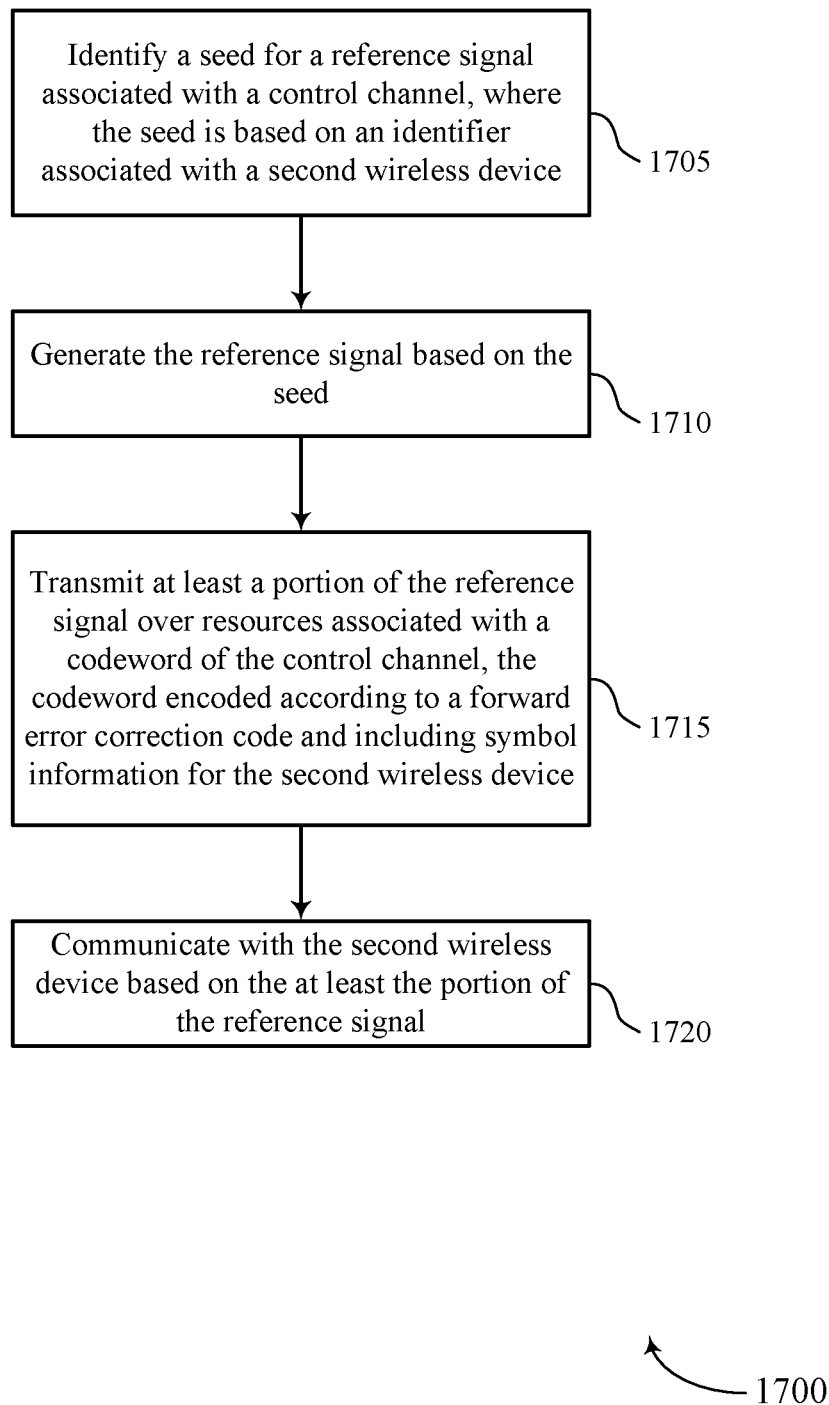

FIG. 17 shows a flowchart illustrating a method 1700 that supports cross-correlation reduction for control signals in accordance with aspects of the present disclosure. The operations of method 1700 may be implemented by a device or its components as described herein. For example, the operations of method 1700 may be performed by a communications manager as described with reference to FIGS. 9 to 13. In some examples, a device may execute a set of instructions to control the functional elements of the device to perform the functions described below. Additionally or alternatively, a device may perform aspects of the functions described below using special-purpose hardware.

At 1705, the device may identify a seed for a reference signal associated with a control channel, where the seed is based on an identifier associated with a second wireless device. The operations of 1705 may be performed according to the methods described herein.

In some examples, aspects of the operations of 1705 may be performed by a seeding manager as described with reference to FIGS. 9 to 13.

At 1710, the device may generate the reference signal based on the seed. The operations of 1710 may be performed according to the methods described herein. In some examples, aspects of the operations of 1710 may be performed by a reference signal generator as described with reference to FIGS. 9 to 13.

At 1715, the device may transmit at least a portion of the reference signal over resources associated with a codeword of the control channel, the codeword encoded according to a forward error correction code (e.g., a polar code) and including symbol information for the second wireless device. The operations of 1715 may be performed according to the methods described herein. In some examples, aspects of the operations of 1715 may be performed by a reference signal manager as described with reference to FIGS. 9 to 13.

At 1720, the device may communicate with the second wireless device based on the at least the portion of the reference signal. The operations of 1720 may be performed according to the methods described herein. In some examples, aspects of the operations of 1720 may be performed by a data manager as described with reference to FIGS. 9 to 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device, comprising:
    determining symbol information associated with a candidate codeword of a control channel, the candidate codeword encoded according to a forward error correction code;
    applying an orthogonal cover code to the symbol information to obtain demasked symbol information for the candidate codeword;
    descrambling the demasked symbol information with a scrambling code to obtain descrambled symbol information for the candidate codeword;
    performing a decoding operation on the descrambled symbol information according to the forward error correction code; and
    communicating with a second wireless device based at least in part on a result of the decoding operation.

2. The method of claim 1, wherein the candidate codeword comprises a plurality of candidate codewords of a search space set for the control channel, wherein each of the plurality of candidate codewords is associated with an aggregation level of a plurality of aggregation levels of the search space set.

3. The method of claim 2, wherein applying the orthogonal cover code comprises:
    applying a plurality of orthogonal cover codes to the plurality of candidate codewords, each of the plurality of orthogonal cover codes determined based at least in part on one of a plurality of base orthogonal cover codes, each of the plurality of base orthogonal cover codes associated with one of the plurality of aggregation levels.

4. The method of claim 3, wherein applying the plurality of orthogonal cover codes comprises:
    aligning the plurality of base orthogonal cover codes to an initial resource for the search space set within the control channel;
    repeating the plurality of base orthogonal cover codes to span resources for the search space set within the control channel; and
    determining the plurality of orthogonal cover codes from the aligned and repeated plurality of base orthogonal cover codes.

5. The method of claim 3, further comprising:
    applying a second plurality of orthogonal cover codes to a second plurality of candidate codewords of a second search space set of a plurality of search space sets, wherein the search space set is a first search space set of the plurality of search space sets configured for the wireless device.

6. The method of claim 3, wherein applying the orthogonal cover code comprises:
    applying a user-specific orthogonal cover code to each of the plurality of candidate codewords.

7. The method of claim 1, further comprising:
    determining the orthogonal cover code by concatenating a plurality of constituent codes, each of the plurality of constituent codes based at least in part on one of a plurality of base orthogonal cover codes.

8. The method of claim 7, wherein each of the plurality of constituent codes has a length corresponding to an exponential function of a base number.

9. The method of claim 1, further comprising:
determining the orthogonal cover code by sampling a continuous waveform function according to a length of the orthogonal cover code, the continuous waveform function selected from a set of mutually orthogonal continuous waveform functions.

10. The method of claim 1, wherein performing the decoding operation comprises:
performing at least one estimation operation based at least in part on the descrambled symbol information.

11. The method of claim 10, wherein performing the at least one estimation operation comprises:
terminating the decoding operation prior to sequential decoding of all sub-channels of the forward error correction code based at least in part on the descrambled symbol information.

12. The method of claim 1, further comprising:
determining the orthogonal cover code based at least in part on a protocol type of the control channel.

13. The method of claim 1, wherein the orthogonal cover code comprises a user-specific orthogonal cover code.

14. The method of claim 1, wherein the orthogonal cover code comprises an orthogonal variable spreading factor code.

15. The method of claim 1, wherein the scrambling code comprises a Gold sequence.

16. The method of claim 1, wherein communicating with the second wireless device based at least in part on the result of the decoding operation comprises:
identifying control information based at least in part on a result of the decoding operation; and
communicating with the second wireless device according to the control information.

17. A method for wireless communications at a wireless device, comprising:
generating a codeword based at least in part on applying a forward error correction encoding operation to a bit vector, the bit vector comprising control information for a second wireless device;
scrambling symbols of the codeword with a scrambling code to obtain scrambled symbol information associated with the codeword;
applying an orthogonal cover code to the scrambled symbol information to generate masked scrambled symbol information associated with the codeword; and
transmitting the masked scrambled symbol information to the second wireless device in a control channel.

18. The method of claim 17, wherein transmitting the masked scrambled symbol information comprises:
transmitting the masked scrambled symbol information in a control candidate of a search space set of the control channel, the control candidate associated with an aggregation level of a plurality of aggregation levels of the search space set.

19. The method of claim 18, further comprising:
determining the orthogonal cover code based at least in part on a base orthogonal cover code associated with the aggregation level.

20. The method of claim 19, wherein determining the orthogonal cover code comprises:
aligning the base orthogonal cover code to an initial resource for the search space set within the control channel; and
repeating the base orthogonal cover code to span resources for the search space set within the control channel.

21. The method of claim 18, wherein the search space set is a first search space set of a plurality of search space sets configured for the second wireless device for the control channel.

22. The method of claim 21, further comprising:
applying a second orthogonal cover code to a second scrambled set of symbols of a second search space set of the plurality of search space sets.

23. The method of claim 18, wherein applying the orthogonal cover code comprises:
applying an aggregation level-specific orthogonal cover code and a user-specific orthogonal cover code to the scrambled symbol information.

24. The method of claim 17, further comprising:
determining the orthogonal cover code by concatenating a plurality of constituent codes, each of the plurality of constituent codes based at least in part on one of a plurality of base orthogonal cover codes.

25. The method of claim 17, further comprising:
determining the orthogonal cover code by sampling a continuous waveform function according to a length of the orthogonal cover code, the continuous waveform function selected from a set of mutually orthogonal continuous waveform functions.

26. The method of claim 17, further comprising:
determining the orthogonal cover code based at least in part on a protocol type of the control channel.

27. An apparatus for wireless communications, comprising:
a processor,
memory in electronic communication with the processor; and
instructions stored in the memory and executable by the processor to cause the apparatus to:
determine symbol information associated with a candidate codeword of a control channel, the candidate codeword encoded according to a forward error correction code;
apply an orthogonal cover code to the symbol information to obtain demasked symbol information for the candidate codeword;
descramble the demasked symbol information with a scrambling code to obtain descrambled symbol information for the candidate codeword;
perform a decoding operation on the descrambled symbol information according to the forward error correction code; and
communicate with a second wireless device based at least in part on a result of the decoding operation.

28. The apparatus of claim 27, wherein the candidate codeword comprises a plurality of candidate codewords of a search space set for the control channel, wherein each of the plurality of candidate codewords is associated with an aggregation level of a plurality of aggregation levels of the search space set, and wherein the instructions to apply the orthogonal cover code are executable by the processor to cause the apparatus to:
apply a plurality of orthogonal cover codes to the plurality of candidate codewords, each of the plurality of orthogonal cover codes determined based at least in part on one of a plurality of base orthogonal cover codes, each of the plurality of base orthogonal cover codes associated with one of the plurality of aggregation levels.

29. An apparatus for wireless communications, comprising:
a processor,
memory in electronic communication with the processor; and instructions stored in the memory and executable by the processor to cause the apparatus to:
generate a codeword based at least in part on applying a forward error correction encoding operation to a bit vector, the bit vector comprising control information for a second wireless device;
scramble symbols of the codeword with a scrambling code to obtain scrambled symbol information associated with the codeword;
apply an orthogonal cover code to the scrambled symbol information to generate masked scrambled symbol information associated with the codeword; and
transmit the masked scrambled symbol information to the second wireless device in a control channel.

30. The apparatus of claim 29, wherein the instructions to transmit the masked scrambled symbol information are executable by the processor to cause the apparatus to:
transmit the masked scrambled symbol information in a control candidate of a search space set of the control channel, the control candidate associated with an aggregation level of a plurality of aggregation levels of the search space set.

* * * * *